(12) United States Patent
Kinoshita et al.

(10) Patent No.: US 12,631,582 B2
(45) Date of Patent: May 19, 2026

---

(54) THERMAL ANALYSIS SYSTEM AND THERMAL ANALYSIS METHOD

(71) Applicant: NETZSCH-Gerätebau GmbH, Selb (DE)

(72) Inventors: Ryoichi Kinoshita, Shizuoka (JP); Kenta Sato, Yokohama (JP)

(73) Assignee: NETZSCH-Gerätebau GmbH, Selb (DE)

( * ) Notice: Subject to any disclaimer, the term of this patent is extended or adjusted under 35 U.S.C. 154(b) by 345 days.

(21) Appl. No.: 18/330,855

(22) Filed: Jun. 7, 2023

(65) Prior Publication Data

US 2024/0035994 A1     Feb. 1, 2024

(30) Foreign Application Priority Data

Jun. 7, 2022    (JP) ................................. 2022-092555

(51) Int. Cl.
*G01N 25/20* (2006.01)
*G01N 25/48* (2006.01)

(52) U.S. Cl.
CPC ........... *G01N 25/20* (2013.01); *G01N 25/486* (2013.01); *G01N 25/4866* (2013.01)

(58) Field of Classification Search
CPC ... G01N 25/20; G01N 25/486; G01N 25/4866
(Continued)

(56) References Cited

U.S. PATENT DOCUMENTS 5,588,746 A * 12/1996 Minobe .................... G01N 5/00
374/45

6,257,757 B1 * 7/2001 Nakamura ......... G01N 25/4846
374/45
(Continued)

FOREIGN PATENT DOCUMENTS

JP        2011247739 A     12/2011

OTHER PUBLICATIONS

Akos, Kriston, et al.; "Quantification and simulation of thermal decomposition reactions of Li-ion battery materials by simultaneous thermal analysis coupled with gas analysis"; Journal of Power Sources, vol. 435; Science Direct, Elsevier B.V; Sep. 30, 2019, 13 Pages.

*Primary Examiner* — Mirellys Jagan
(74) *Attorney, Agent, or Firm* — Whitmyer IP Group LLC

(57)                    ABSTRACT

To provide a thermal analysis system and a thermal analysis method capable of easily performing thermal analysis while suppressing atmospheric exposure associated with sample movement. A thermal analysis system according to the present disclosure includes a sample preparing unit and a thermal analyzing unit. The sample preparing unit includes a wall portion forming an internal space, a gate portion capable of opening and closing an opening of the wall portion, and a sample holding member including a sample holder and temperature sensors. The thermal analyzer includes a moving mechanism for moving a sample holder into a thermal analysis part, a sealing mechanism for sealing the sample holder from an internal space of a sample preparation part, and a coupling mechanism for connecting a heating tube of the thermal analysis part to a gate part in a state of sealing the heating tube from the outside. A heating tube for housing a sample holder from a sample preparing part and a heating part for heating the heating tube are provided.

13 Claims, 13 Drawing Sheets

(58) Field of Classification Search
USPC ............................................... 374/12, 31, 14
See application file for complete search history.

(56) References Cited

U.S. PATENT DOCUMENTS

| | | | | |
|---|---|---|---|---|
| 2013/0235899 A1* | 9/2013 | Nagasawa | .............. | G01N 25/00 |
| | | | | 374/14 |
| 2020/0292431 A1* | 9/2020 | Kumazaki | ................ | G01N 5/00 |
| 2020/0400510 A1* | 12/2020 | Ito | .......................... | G01K 11/12 |

\* cited by examiner

To the mass
spectrometer

THERMAL ANALYSIS SYSTEM AND THERMAL ANALYSIS METHOD

TECHNICAL FIELD

This disclosure relates to a thermal analysis system and a thermal analysis method for analyzing the weight variation or the endothermic/exothermic changes of a substance.

BACKGROUND

In recent years demand has increased greatly for rechargeable batteries and the like used in electric automobiles for the purpose of the elimination of need for hydrocarbons and for power sources for use in emergencies. There are many materials generating chemical reactions by means of oxygen or moisture in leading edge materials such as battery materials, and the importance of thermal analysis of the thermal properties when heated or cooled or of the generated gas component analysis from the materials is increasing. Moreover, recently in the conduct of precision analysis of battery materials there is a necessity for the conduct thereof under an atmosphere with a reduced residual moisture content, for example, there is demand to deal with an environment under which the dew point is less than or equal to −80° C.

Against this background, in the latest analysis of battery materials, for example, the test materials are created under a specialist environment in a glove box, and techniques to introduce them to the analysis device sealing the test materials in a specialist vessel, so as not to expose the test materials to the atmosphere when introducing the test materials to the analysis device, or the performance of analysis using technology disposing the analysis device in a glove box.

For example, in Patent Reference 1, after sampling the samples in dedicated sample containers in a glovebox, it is possible to take the samples out of the glovebox for analysis in a state sustaining non-exposure to the air, by means of sealing the sample vessel by means of indium or gallium.

On the other hand, in Non-patent Reference 1, there is the installation in a dedicated glovebox of a thermogravimetric and differential scanning calorimeter (TG/DSC), and while conducting thermal gravimetric and differential scanning calorimetry, the gas generated during analysis is transported out of the glovebox by means of a transfer line, and a gas chromatography mass spectrometer (GCMS) device and Fourier transform infrared spectrophotometer (FTIR) are connected to the outlet of the transfer line, to perform an analysis method employing TG/DSC-GC/MS and TG/DSC-FTIR. Prior art references.

PATENT REFERENCES

Patent reference 1: Japanese laid-open unexamined patent publication 2011-247739 Non-patent reference 1.

Akos, Kriston et al., "Quantification and simulation of thermal decomposition reactions of Li-ion battery materials by simultaneous thermal analysis coupled with gas analysis" Journal of Power Sources, Volume 435, 30 Sep. 2019, 226774.

However, in the analysis method disclosed in patent reference 1, after sealing the sample vessel lid using indium or gallium within a glovebox, the sample vessel is extracted from the glovebox, there is the disclosure of technology such that that the sample vessel is installed in a heating analysis device to conduct analysis. More specifically, the indium or gallium is melted by means of the heat during the heating analysis measurement, and the sample vessel seal is broken in a method to analyze the gas generated, but because the generalized sample vessel employed in the heating analysis is extremely small with an internal capacity of 40 to 100 μL, experience and effort is required to conduct the operation of sealing the sample vessel in the glovebox. Moreover, it is not easy to conduct any confirmation of seal leaks and the like in the glovebox, and it is impossible to tell whether the status of the seal is good or not without performing the analysis. Moreover, there is the possibility of the generation of exposure to the atmosphere of the sample in tandem with the transfer of the sample.

Furthermore, because there is the possibility of the lids blowing off due to the pressure difference on connecting the vacuum line to the sealed sample vessel, there is no possibility of exposure to a vacuum after extraction of the sample vessel from the glovebox. For that reason, the atmosphere in the heating in the furnace of the thermal analysis device employs gas flow and not vacuum, and there is a need to reduce the oxygen density and dew point, such that there is a long wait duration until the initiation of the measurement. Furthermore, it is well-known that indium or gallium react with halogens such as chlorine or bromine, and this raises the possibility of samples including halogens of the battery materials and the like affecting the thermal analysis results.

With the method of Non-patent Reference 1, because there is the installation of the heating analysis device in a glovebox, the dew point within the glovebox is elevated by means of the heat of the heating furnace during analysis and the heat of the transfer line, such that it is difficult to sustain an atmosphere with a dew point below −80° C. as is increasingly demanded in recent years. Moreover, with that glovebox with the heating analysis device installed therein, it is difficult to prepare samples because of the lack of operating space, and when the samples are prepared in another glovebox, this generates the risk of atmospheric exposure in tandem with the transfer of the samples.

Furthermore, other than the increasing cost incurred by the necessity for a larger glovebox in order to install the heating analysis device, this also requires an opening-up operation of the glovebox for the installation of the device and the maintenance thereof. As a result, in the start-up of the device after installation or maintenance thereof, a very long waiting time of several days to several weeks is required in order to lower the dew point in the glovebox, and there is much room for improvement in respect of these points.

SUMMARY

The object of the present disclosure, having considered these points, is to provide a thermal analysis system and a thermal analysis method enabling the easy implementation of thermal analysis while suppressing the exposure to the atmosphere in tandem with sample transfer.

The thermal analysis system of this disclosure, in order to resolve these issues, is characterized by comprising:

A sample preparation means wherein the samples subject to analysis are disposed, and a thermal analysis means conducting the thermal analysis of the samples, wherein said sample preparation means comprises:

a walled means circumscribing an internal space, a pass box provided in said walled means employed when introducing samples and the like from the exterior thereof, a freely openable gate means comprising an aperture means provided in said walled means, a sample holding member having samples mounted on a sample holder, and a temperature sensor measuring the temperature of the samples, a transfer mechanism transferring said sample holder through said aperture means into said thermal analysis means, a sealing mechanism sealing said sample holder in the internal space of said sample preparation means while said sample holder is being transferred into said thermal analysis means, and a coupling mechanism coupling the heating tube of said thermal analysis means to said gate means in a sealed state with respect to the exterior thereof, wherein said thermal analysis means comprises:

said heating tube housing the sample holder from said sample preparation means, and a heating means heating said heating tube and surrounding said heating tube on the outer side thereof.

Moreover, the thermal analysis system of this disclosure preferably additionally comprises:

in respect of the configuration described above, said thermal analysis means having a pump means drawing a vacuum within said heating tube, and a gas supply means in order to sustain the dew point at a specific temperature while the pressure in said heating tube is returned to atmospheric pressure.

Moreover, the thermal analysis system of this disclosure, in respect of the configuration described above, wherein said sample holding member preferably comprises a reference substance holder mounting a reference substance adjacent to the samples, and said temperature sensor is a differential thermal analysis sensor measuring the temperature difference between the samples and the reference substance.

Furthermore, the thermal analysis system of this disclosure, in respect of the configuration described above, wherein said sample holding member preferably additionally comprises a reference substance holder mounting a reference substance adjacent to the samples and said temperature sensor is a differential scanning calorimetry measurement sensor measuring the temperature difference between the samples and the reference substance, as well as heat flux difference flowing into the samples and the reference substance.

Furthermore, the thermal analysis system of this disclosure, in respect of the configuration described above, preferably additionally comprises a system control means controlling said sample preparation means and said thermal analysis means, said system control means displaces said sample holder within said thermal analysis means, in a state sustaining both of the dew point temperature and the pressure in the internal space of said sample preparation means and in said heating tube simultaneously.

Furthermore, the thermal analysis system of this disclosure, in respect of the configuration described above, wherein said system control means preferably displaces said sample holder within said thermal analysis means, in a state sustaining the dew point temperature at or under −80° C. in the interior space of said sample preparation means and in said heating tube.

Furthermore, the thermal analysis system of this disclosure, in respect of the configuration described above, wherein said sample preparation means preferably comprises an auto sampler changing out the samples in said sample holder, and a sample tray holding multiple samples, said auto sampler transfers the samples from said sample tray to said sample holder, and by returning the thermally analyzed samples from said sample holder to said sample tray, preferably sequentially supplies multiple samples to said sample holder.

Moreover, the thermal analysis system of this disclosure, in respect of the configuration described above, wherein said sample holding member preferably comprises a horizontal type balance mechanism enabling the measurement of the mass of the sample, and the wiring from said horizontal type balance mechanism leads to the internal space of said sample preparation means through the interior of said coupling mechanism and said sealing mechanism.

Moreover, the thermal analysis system of this disclosure, in respect of the configuration described above, wherein said sample holding member comprises two parallel arrayed horizontal type balance mechanisms, and one of said two horizontal type balance mechanisms comprises a sample holder, and the other comprises the reference substance holder, detecting the differential calorimetry signal of the mass difference between the sample and the reference substance.

Furthermore, the thermal analysis system of this disclosure, in respect of the configuration described above, wherein said sealing mechanism is preferably provided by said walled means of said sample preparation means, and comprises an open tube extending from the proximal edge means of said aperture means to the interior space side of said sample preparation means, and an annular sealing member provided on the interior surface of the open tube, and a sealing tube surrounding the outside of the basal terminal means of the sample holding member disposing said sample holder on the tip terminus thereof, and the outer peripheral surface of said sealing tube fits-in to the diameter direction inner surface of said sealing member.

Furthermore, the thermal analysis system of this disclosure, in respect of the configuration described above, wherein said open tube preferably extends from said aperture means to the outer side of said walled means, and said to gauge means is fitted on the outer terminal means of said open tube, and in the fitted-in state of the outer peripheral surface of said sealing tube to the diameter direction inner side surface of said sealing member, and by means of the displacement of said sample holder by means of said displacement mechanism, said sample holder is disposed in a switchable manner between the inner side of said open tube in the standby position, and the thermal analysis position housing said sample holder in said heating tube.

Furthermore, the thermal analysis system of this disclosure, in respect of the configuration described above, preferably the inner means of said open tube in respect of the outer side of said walled means can draw vacuum and/or or can supply gas to the inner means of said open tube.

Furthermore, the thermal analysis system of this disclosure, in respect of the configuration described above, wherein the heating means of said thermal analysis means preferably has a perforation through hole from the exterior for the purposes of confirmation of the position of said sample holder.

Moreover, in order to resolve the issues described above, the thermal analysis method of the present disclosure, is a thermal analysis method by means of a thermal analysis system comprises: a sample preparation means disposing samples subject to analysis, and a thermal analysis means conducting thermal analysis of samples, characterized by said sample preparation means comprising a walled means circumscribing an internal space, a pass box provided in said walled means employed when introducing samples and the like from the exterior thereof, a freely openable and closable gate part comprising an aperture means provided in said walled means, and a sample holding member having samples mounted on a sample holder, and a temperature sensor measuring the temperature of the samples, a transfer mechanism transferring said sample holder through said aperture means into said thermal analysis means, a sealing mechanism sealing said sample holder in the internal space of said sample preparation means while said sample holder is being transferred into said thermal analysis means, and a coupling mechanism coupling the heating tube of said thermal analysis means to said gate means in a sealed state with respect to the exterior thereof, wherein said thermal analysis means comprises:

said heating tube housing the sample holder from said sample preparation means, and a heating means heating said heating tube surrounding said heating tube on the outer side thereof, and comprising the displacement step of said sample holder to the inside of said thermal analysis means while the pressure and dew point temperature of the inner space of said sample preparation means and the inside of said heating tube are in a simultaneously sustained state.

The thermal analysis method of the present disclosure, in respect of the configuration of the above described, preferably additionally comprising a step wherein said sample holder passes from said thermal analysis means while in a state disposed in a sealed state with respect to both of the inner space of said sample preparation means and the inside of said heating tube and is returned to the inner means space of said sample preparation means.

By means of the present disclosure, the provision of a thermal analysis system and thermal analysis method enabling the easy implementation of thermal analysis while suppressing exposure to the atmosphere thereof in tandem with the sample displacement is enabled.

DETAILED DESCRIPTION

Hereafter, embodiments of the present disclosure are explained in detail while referring to the figures.

Figure 1:
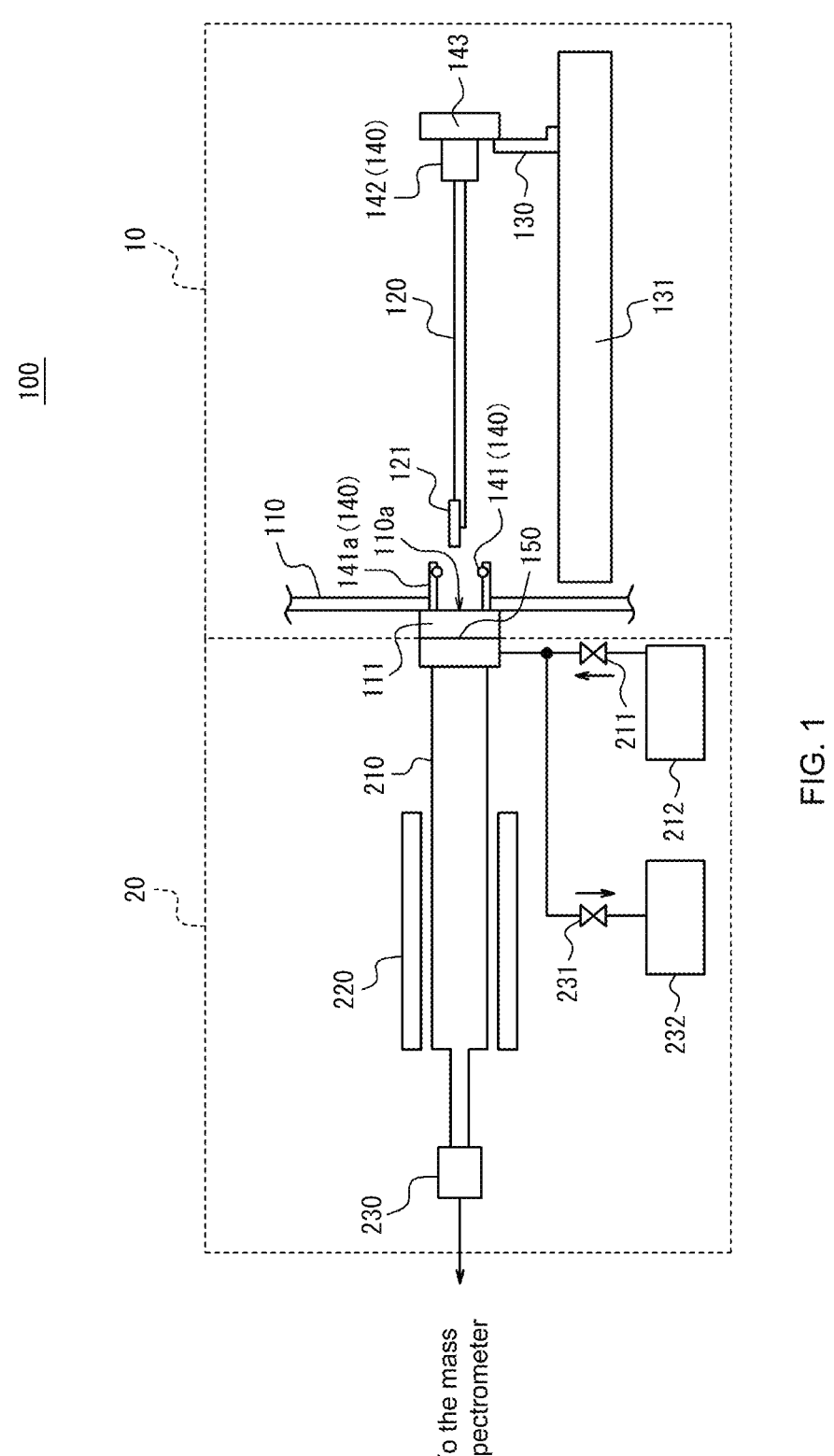
FIG. 1: A drawing illustrating the configuration of the mechanism parts of the thermal analysis system of the first embodiment of the present disclosure.

FIG. 1 is a drawing illustrating the configuration of the mechanism parts of the thermal analysis system 100 of the first embodiment of the present disclosure. This thermal analysis system 100 provides the sample preparation means 10 disposing the samples which are the subject of analysis, and the thermal analysis means 20 conducting the thermal analysis of the samples.

The sample preparation means 10 is the functional means in order to dispose the samples which are the subject of analysis by the thermal analysis system 100 into the sample holding member 120 under an atmosphere which was previously prepared before the thermal analysis. The sample preparation means 10 is a sealed container designed so as only allow a hand into the inner part thereof, so as to enable operations under conditions blocking the external atmosphere and is, for example, a glovebox and the like.

The sample preparation means 10 comprises the walled means 110 circumscribing an inner space therein, the gate means 111 which can open and close the aperture means 110a provided in the walled means 110, the sample holding member 120 having the sample holder 121 mounting the samples, the transfer mechanism 130 transferring the sample holder 121 through the aperture means 110a into the thermal analysis means 20, the sealing mechanism 140 sealing the sample holder 121 into the inner space of the sample preparation means 10, the coupling mechanism 150 coupling the heating tube 210 of the thermal analysis means 20 to the gate means in a sealed state with respect to the exterior thereof, the first pump means 170 (refer to FIG. 2) in order to draw vacuum to the inner space, the first gas supply means 171 inducting gas after creation of the vacuum, the gas supply valve 172, the auto sampler 160 switching-in and out the samples in the sample holder 121, the temperature measurement means 300 conducting the temperature measurement of the samples employing the temperature sensor 122 within the sample holding member 120, and the box control means 101 controlling the operations of the sample preparation means 10. Moreover, the sample preparation means 10 additionally provides a so-called pass box 180 (refer to FIG. 2) via the walled means 110 to the inner space. On the occasion of inserting samples from the exterior into the sample preparation means 10, the operator first opens the outer door of the pass box 180, and after inserting the samples into the pass box 180, the environment in the pass box 180 is prepared. This involves the exhaustion of the air in the pass box 180 to create a vacuum, this is followed by the operation of substitution by an appropriate dry gas, which may be repeated as required for the preparation thereof. On that occasion, the vacuum pump, gas supply means, and the gas supply valve may be jointly used by the above described first pump means 170, the first gas supply means 171 and the gas supply valve 172. The samples may be inserted into the inner space of the sample preparation means 10, by means of opening of the inner door separating the inside of the pass box 180 from the inner space of the sample preparation means 10. In this embodiment, the pass box 180 may be disposed adjacent to the outer side of the walled means 110, which is not illustrated in the figures, opposite the walled means 110 wherein the aperture means 110a is provided.

There is an open tube 141a provided in the walled means 110 extending to the inner space side of the sample preparation means 10 from the proximal edge means of the aperture means 110a, and there is an O-ring 141 provided on the inner surface of the open tube 141a, sealing the sample holder 121 into the inner space of the sample preparation means 10, which is in contact with the outer surface of a later described sealing tube 142.

In FIG. 1, the walled means 110 is only drawn with one wall means 110 extending in the vertical direction, but multiple walled means 110 are providing circumscribing and sealing the inner space. Moreover, the sample preparation means 10 may additionally provide a gas supply means for the purposes of preparing the atmosphere of the inner space. When the sample preparation means 10 is a glovebox, gloves may be provided protruding from the walled means 110 into the inner space so that the operator can insert their hands thereto and conduct the operations. In this embodiment, the configuration is one such that the samples in the sample tray are automatically disposed into the sample holder 121 by means of the auto sampler 160, but the operator may dispose the samples into the sample holder 121 using gloves, instead of an auto sampler 160.

Figure 3:
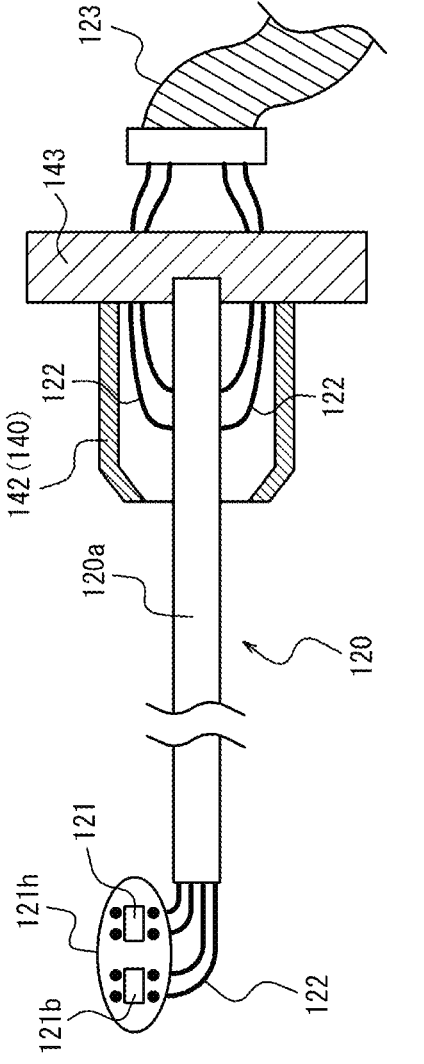
FIG. 3: A diagram illustrating the details of the parts of the sample holding means of FIG. 1.

As illustrated in FIG. 3, the sample holding member 120 provides the holding arm 120a extending towards the thermal analysis means 20, the sample holders 121 and reference substance holder 121b disposed adjacent to the heatsink 121h of the tip terminus of the holding arm 120a (left side edge in FIG. 1), and the holding base 143 fixed to the base of the holding arm 120a (the right side edge in FIG. 1). The sample holding member 120 is fixed to the movable side of the transfer mechanism 130 by means of the holding base 143.

The sealing tube 142 is formed integrally from stainless steel [extending] from the holding base 143 to the tip terminus direction (left direction of FIG. 1). In this embodiment, the sealing tube 142 has a cylindrical shape, and the holding arm 120a extends to the tip terminal side through the tip terminal aperture.

Figure 5:
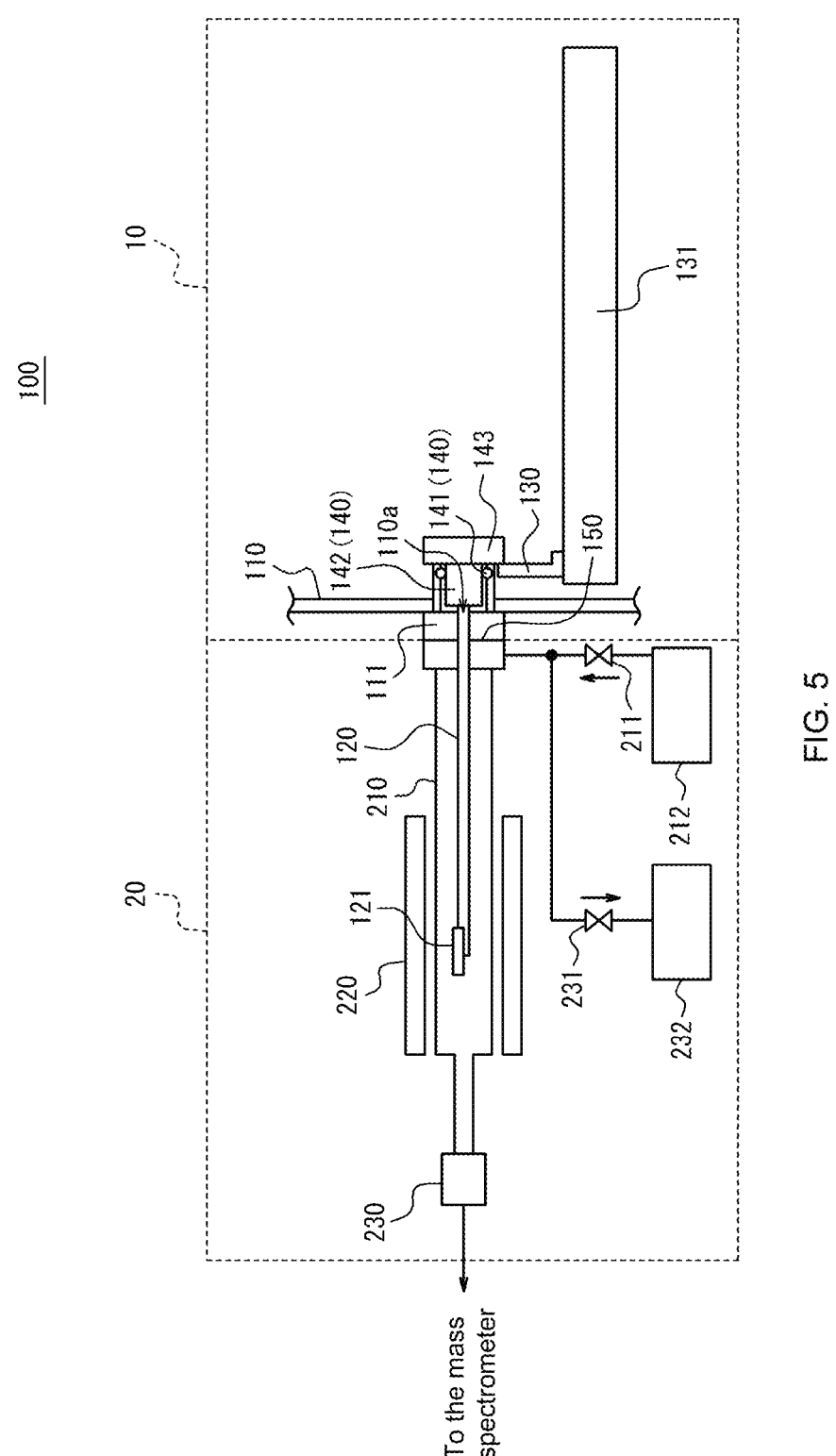
FIG. 5: A drawing illustrating the execution state of the thermal analysis using the thermal analysis system of the first embodiment of the present disclosure.

In this embodiment, as illustrated in FIG. 5, when thermal analysis is performed, the outer peripheral surface of the sealed tube 142 fits in to the O-ring 141 provided on the inner surface of the open tube 141a, blocking the sample holder 121 from the atmosphere of the inner space of the sample preparation means 10. In other words, in this embodiment, the sealing tube 142, the open tube 141a and the O-ring 141 configure the sealing mechanism 140 sealing the sample holder 121 with respect to the inner space of the sample preparation means 10.

As illustrated in FIG. 3, two temperature sensors 122 extend downwards from the respective bottom surfaces of the sample holder 121 and the reference substance holder 121b. In this embodiment, the temperature sensor 122 is a thermocouple. The thermocouple may employ, for example, a junction between platinum (Pt) and a platinum rhodium alloy (PtRh).

Figure 2:
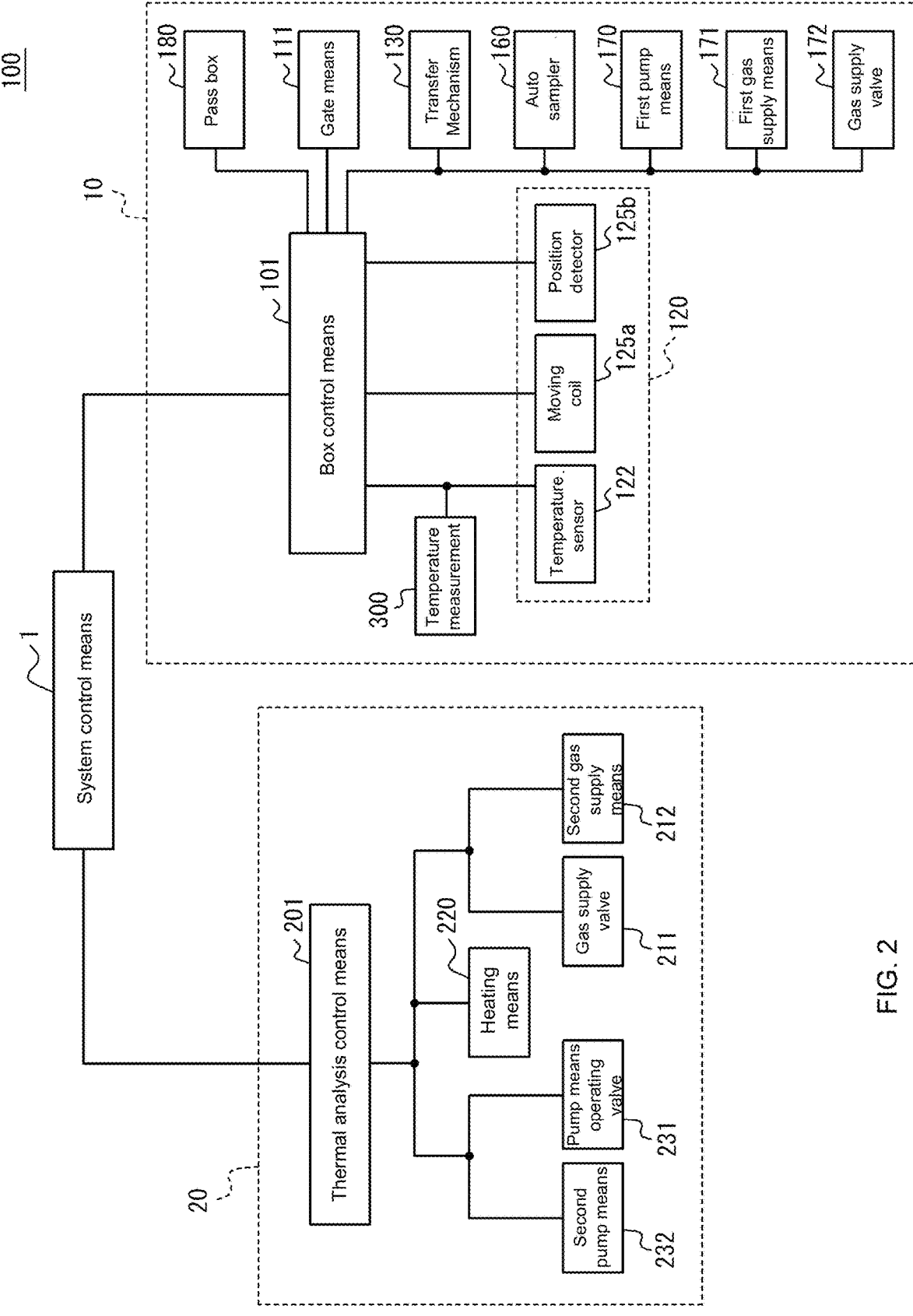
FIG. 2: A block diagram illustrating the configuration of the control system of the thermal analysis system of the first embodiment of the present disclosure.

The two pairs of temperature sensors 122 illustrated in FIG. 3 are individually wired through four core tubes disposed along the rod-shaped holding arm 120a and are further wired into the holding base 143 from the base terminal means (right part of FIG. 3) of the holding arm 120a, such that they are electrically connected to the flat cable 123 connected to the temperature measurement means 300. The temperature sensor 122 is connected to the temperature measurement means 300, as illustrated in FIG. 2, and every output voltage being signal processed at the temperature measurement means 300, such that the detection of the sample temperature TS, reference substance temperature TR, and the temperature difference ΔT between the sample and the reference substance, and the like is enabled.

Figure 6:
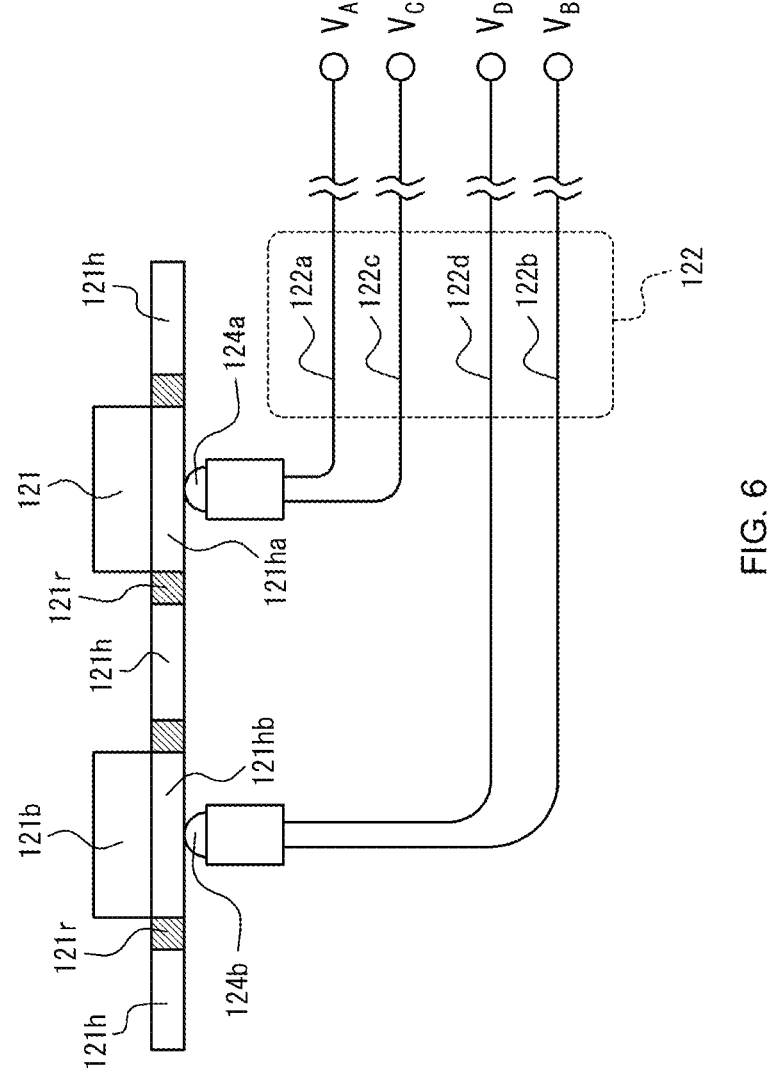
FIG. 6: A diagram illustrating the configuration of the sample holder and the thermocouple used in the thermal analysis system of the first embodiment of the present disclosure.

The sample holder 121 and the temperature sensor 122 and the like employed in the thermal analysis, for example, have the configuration illustrated in FIG. 6. In FIG. 6, the sample holder 121 and the reference substance holder 121b are formed from the same materials and are formed with substantially the same shape and are disposed arrayed in the horizontal direction. Moreover, the sample holder 121 and the reference substance holder 121b are mounted on the mounting surfaces 121ha and 121hb formed from the same material on the same surface as the heatsink 121h connected to a specific temperature resistor means 121r in respect of the planar shaped heatsink 121h. The temperature measurement contact points 124a and 124b of the thermocouple temperature sensor 122 are disposed on the lower surfaces of the mounting surfaces 121ha and 121hb of the sample holder 121 and the reference substance holder 121b, enabling the measurement of the temperature and temperature difference between the samples and the reference substance in the sample holder 121 and the reference substance holder 121b by means of the thermocouple temperature measurement contacts 124a and 124b.

The material of the sample holder 121 and the reference substance holder 121b, in consideration of the temperature measurement conditions and the like, can be for example, alumina, platinum, platinum rhodium alloy, quartz glass, aluminum, magnesium oxide (MgO), indium oxide (Y2O3), gold (Au), silver (Ag), graphite, boron nitride (BN), molybdenum (MO) or zirconium oxide (ZrO2).

The temperature sensor 122, as illustrated in FIG. 6, has the thermocouple element wire 122a and the thermocouple element wire 122c extending downwards from the temperature measurement contact point 124a, in addition to extending towards the base terminal means of the sample holding member 120. In the same manner, the thermocouple element wire 122d and the thermocouple element wire 122b extend downwards from the temperature measurement contact point 124b, in addition to extending towards the base terminal means of the sample holding member 120. The temperature measurement contact point 124a is connected, for example, by welding to the upper terminal means of the thermocouple element wire 122a and the thermocouple element wire 122c, and that connection means is configured in an electrically conductive manner to the above-mentioned lower surface of the mounting surface 121ha of the sample holder 121. The temperature measurement contact point 124b is connected by means of welding in the same manner to the upper terminal means of the thermocouple element wire 122d and the thermocouple element wire 122b, that connection means is configured to be electrically conductive with the lower surface of the mounting surface 121hb of the previously described reference substance holder 121b.

In this embodiment, for example, the material of the thermocouple element wire 122a and the thermocouple element wire 122b can be a platinum rhodium alloy (PtRh), and the material of the thermocouple element wire 122c and the thermocouple element wire 122d can be platinum (Pt). On this occasion, by having the material of the thermal resistance means 121r and the heatsink 121h be platinum (Pt), the pair of mounting surfaces 121ha and 121hb of the sample holder 121 and the reference substance holder 121b are electrically connected by means of platinum (Pt). By configuring from these materials, the junction between the thermocouple element wire 122a and the thermocouple element wire 122b is configured by the junction PtRh—Pt—PtRh. By means of this configuration, the measurement of the temperature difference between the PtRh—Pt junction point on the one hand, and the PtRh—Pt junction point on the other hand is enabled. Then, this temperature difference is the temperature difference between the sample holder 121 and that of the reference substance holder 121b. Now, thermocouples configured by means of this platinum and platinum-rhodium alloy, while having a thermoelectric power in respect of temperature variation, in other words, a low Seebeck coefficient, they are characterized by enabling high temperature measurements at and above 1500° C.

Figure 7:
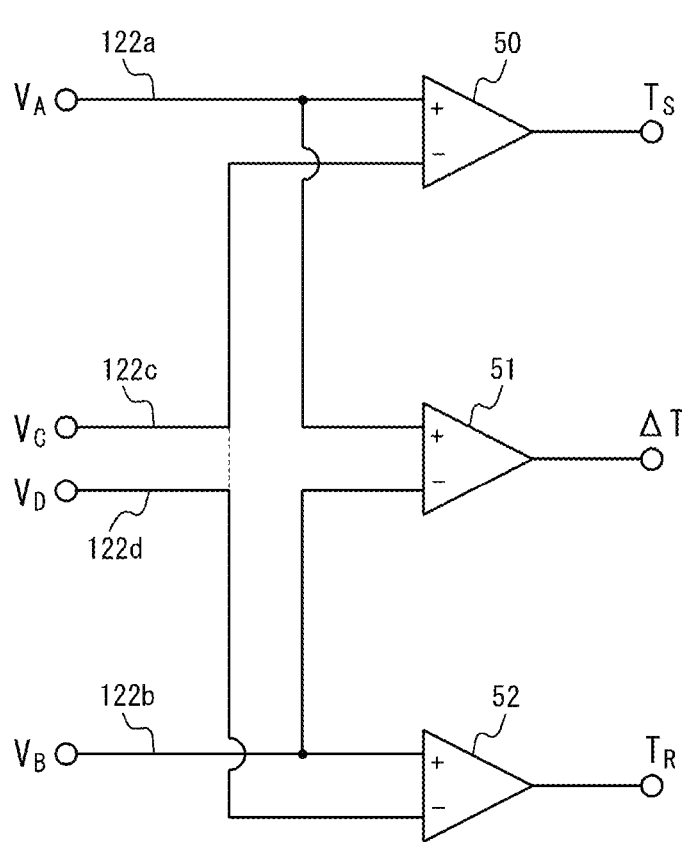
FIG. 7: A configuration drawing of the temperature measurement means configuring the thermal analysis system of the first embodiment of the present disclosure.

Moreover, in respect of the above described PtRh—Pt—PtRh junction, the measurement of the temperature difference between one of the PtRh—Pt junctions and the other PtRh—Pt junction is enabled by the potential difference (VA–VB) between the thermocouple element wire 122a and the thermocouple element wire 122b of FIG. 7.

In this embodiment, the temperature difference between the sample in the sample holder 121 and the reference material in the reference material holder 121b is considered to approximate to the temperature difference between the sample holder 121 and the reference material holder 121b, respectively, as measured by means of the above described PtRh—Pt—PtRh junction.

Moreover, in FIG. 6, the thermocouple element wire 122a and the thermocouple element wire 122c are formed by the temperature measurement contact point 124a, in other words, by the PtRh—Pt junction in the vicinity of the back surface of the sample holder 121. Therefore, there is the measurement of the potential difference (VA–VC) between the thermocouple element wire 122a and the thermocouple element wire 122c, and by applying an appropriate correction in the cold junction circuit (not illustrated in the figures), the measurement of the temperature of the sample holder 121 is enabled. Moreover, the temperature of the sample in the sample holder 121 is considered to approximate to the temperature of the sample holder 121.

Now it is also possible to have the material of the thermocouple element wire 122a and the thermocouple element wire 122b made of platinum (Pt), and the material of the thermocouple element wire 122c and of the thermocouple element wire 122d made of platinum-rhodium (PtRh). On that occasion, the material of the thermal resistance means 121r and the heatsink 121h should be platinum-rhodium alloy (PtRh). In other words, the thermocouple element wires 122a and 122b and the thermocouple element wires 122c and 122d configure the thermocouples, and the material of the thermal resistance means 121r and the heatsink 121h is the same as that of the thermocouple element wires 122c and 122d.

Next, an explanation is provided of the temperature measurement means 300.

FIG. 7 is a block diagram representing the configuration of the temperature measurement means 300. The voltages VA, VB, VC and VD of the thermocouple element wire 122a, thermocouple element wire 122b, thermocouple element wire 122c and the thermocouple element wire 122d are input to the temperature measurement means 300.

In the case of a differential scanning calorimeter (hereafter referred to as 'DSC'), the mounting surfaces 121ha and 121hb of the sample holder 121 and the reference material holder 121b are made conducive by means of the thermal resistor means 121r and the heatsink 121h, and in the above described embodiment, the connection between the thermocouple element wire 122a and the thermocouple element wire 122b is configured by a PtRh—Pt—PtRh junction. Then, in respect of the PtRh—Pt—PtRh junction, the temperature difference between one of the PtRh—Pt junction points (in the vicinity of the lower direction of the sample holder 121), and the other PtRh—Pt junction point (in the vicinity of the lower direction of the reference material holder 121b) can be measured as the electrical potential difference (VA–VB) between the thermocouple element wire 122a and the thermocouple element wire 122b at the temperature measurement means 300 of FIG. 7. By this means, the temperature difference between the sample holder 121 and that of the reference material holder 121b, in other words, the temperature difference ΔT between the sample in the sample holder 121 and the reference material of the reference material holder 121b can be directly detected as the output voltage of the differential amplifier 51.

Moreover, the temperature measurement of the sample holder 121 is enabled by means of measurement of the potential difference (VA–VC) between the thermocouple element wire 122a and the thermocouple element wire 122c and appropriate correction of the cold contact point circuit. At the temperature measurement means 300, the configuration is such that there is output of the sample temperature TS (VA–VC) by the differential amplifier 50. In a similar manner, the differential amplifier 52 is configured so as to output the reference substance temperature TR (VB–VD).

On the other hand, in the case of differential thermal analysis (hereafter referred to as "DTA"), in the temperature measurement means 300 of FIG. 7, there is a short of the thermocouple element wire 122c and the thermocouple element wire 122d (the dotted line in FIG. 7) (the establishment of VC=VD), a circuit is configured enabling the direct detection of the difference (VA–VB) between the generated thermoelectric power (VB–VD) corresponding to the temperature, in other words the temperature of the reference substance holder 121b. By this means, the temperature difference between the sample holder 121 and the reference substance holder 121b, in other words, the temperature difference ΔT between the sample in the sample holder 121 and the reference material in the reference material holder 121b can be directly detected as the output potential of the differential amplifier 51.

Now, in relation to the conversion from the output potential deference to the temperature, for example, conduct the DSC of a substance wherein the transition temperature is known, and from the transition temperature of the corresponding substance and the output potential difference, the performance of correction of the temperature conversion value (temperature correction) is enabled.

In the event that the thermal analysis means 20 does not conduct DSC or DTA, the reference substance holder 121b need not necessarily be provided.

The sample holding member 120, as illustrated in FIG. 1, is mounted on the transfer mechanism 130, and is configured to be movable towards the direction of the thermal analysis means 20 in respect of the base 131 (the direction of the left in respect of FIG. 1). By the sample holding member 120 being displaced to the thermal analysis means 20 by means of the transfer mechanism 130, the sample holder 121 provided on the tip terminal means of the sample holder member 120 (the left terminal means in FIG. 1) can be inserted into the heating tube 210 of the later described thermal analysis means 20.

The transfer mechanism 130 enables the displacement of the movable automatic stage in the left right direction of FIG. 1 by means of a command from the box control means 101 represented in FIG. 2. The transfer mechanism 130 may also be a manually displaceable stage using the gloves of an operator.

The gate means 111 is a vacuum gate enabling the switchover between open/blocking of the atmosphere between the inner space of the sample preparation means 10 and the exterior (including the thermal analysis means 20). The gate means 111 is configured so as to be openable and closable by means of commands from the box control means 101 as illustrated in FIG. 2.

There is provision of the heating tube 210 of the later described thermal analysis means 20 and the coupling mechanism 150 coupling in an airtight manner at the thermal analysis means 20 side of the gate means 111. By means of this coupling mechanism 150, coupling of the gate means 111 in the sealed state with respect to the exterior of the heating tube 210 is enabled. By means of this configuration, when the gate means 111 is in the open state, the initiation of the thermal analysis of the sample holder 121 from the sample preparation means 10 while exposed to the atmosphere of within the heating tube 210 and in a state sealed off from the exterior is enabled.

The temperature measurement means 300 receives signals from the temperature sensor 122 and the like, and after measuring the sample temperature TS, reference substance temperature TR, and the temperature difference ΔT between the sample and the reference substance, sends the results of the temperature measurement via the box control means 101 and the later described system control means 1 to the thermal analysis control means 201 and the like. The box control means 101 performs the control of the gate means 111, the transfer mechanism 130, the first pump means 170 and the like. All of the processes at the box control means 101 can be implemented, for example, by specific programs recorded in memory means and the like which are not illustrated in the figures and implemented by software processing by means of execution at the central processing unit (CPU) or a digital signal processor (DSP) which are provided by the box control means 101. However, not limited to this embodiment, a hardware configuration is also possible which enables the implementation of the processes by hardware processing, for example, by means of application-specific integrated circuits (ASIC), programmable logic devices (PLD) or by field programmable gate arrays (FPGA) and the like.

The memory means recording the above-described specific programs comprises readable memory media, and as that memory media there are rewritable EPROM, EEPROM and flash memories and the like, or programmable ROM or magnetic disk recording media capable of storing information and the like, other tangible memory media or combinations of the above. The memory means may be provided in the box control means 101, or may be memory media in an external recording device which is connectable to the box control means 101.

The thermal analysis means 20 comprises the heating tube 210 housing the sample holder 121 from the sample preparation means 10, a heating means 220 heating the heating tube 210 surrounding the heating tube 210 from the outside thereof, and the thermal analysis control means 201 (refer to FIG. 2) controlling the operations of the thermal analysis means 20. The heating means 220, for example, may be a heating furnace covered by thermal insulation material.

In this embodiment, the thermal analysis means 20 also comprises a second gas supply means 212 supplying gas to the inside of the heating tube 210, and a second pump means 232 drawing a vacuum in the heating tube 210.

The second pump means 232, for example, may be enabled by a rotary pump or a dry pump. The reduction of the dew point in the heating tube 210 is facilitated by drawing a vacuum in the heating tube 210 using a rotary pump or a dry pump. The dew point temperature in the heating tube 210 is preferably below −40° C., and even more preferably below −60° C. and most preferably below −80° C.

The relationship between the degree of the vacuum and the dew point temperature is such that, if hypothetically the gas in the space is water vapor, with a degree of vacuum of 13.3 [Pa], the dew point temperature is −43° C.; with a degree of vacuum of 1.33 [Pa] the dew point temperature is −61° C., with a degree of vacuum of 0.133 [Pa] the dew point temperature is −77° C. and with a degree of vacuum of 0.0133 [Pa] the dew point temperature is −90° C.

The drawing of a vacuum is achieved by closing the joint 230 with an attached closure valve and the gas supply valve 211, opening the pump means operation valve 231 and conducting the operation of the second pump means 232. After drawing the vacuum, the pump means operation valve 231 is closed off, next the gas supply valve 211 is opened and there is the supply of dry helium gas into the heating tube 210 with the dew point below −80° C., then a return to atmospheric pressure, and the substitution with a so-called vacuum gas is performed. The gas supply valve 211 is closed, and the pump means operation valve 231 is once more opened, and a vacuum is drawn once more into the heating tube 210 by the second pump means 232. After drawing the vacuum, the pump means operation valve 231 is closed off, the gas supply valve is opened, and a dry helium gas is supplied from the second gas supply means 211 into the heating tube 210 with the dew point below −80° C., and there is a return to atmospheric pressure. By repeating this vacuum gas substitution operation 2 to 3 times, there is the prompt preparation of an atmosphere in the heating tube 210 with a dew point below −80° C. in readiness for the analysis of leading-edge materials such as battery materials.

As the capacity of the second pump means 232, for example, a turbo molecular pump capable of achieving $1.0\times10^{-2}$ [Pa] may be employed.

The second pump means 232 does not necessarily need to be a turbo molecular pump capable of achieving $1.0\times10^{-2}$ [Pa], and other than a general rotary pump, dry pumps such as a scroll pump, a Roots pump, or a diaphragm pump may be employed, and after reducing the pressure to below 1000 [Pa], gas is supplied into the heating tube 210 from the second gas supply means 212, and by repeating thereafter the drawing of a vacuum and supply of gas operations, the reduction of the dew point to below −80° C. is enabled.

For example, what is important in the analysis of leading-edge materials such as battery materials are the dew point and oxygen concentration in the atmosphere, but in the event that it is a normal air atmosphere in the heating tube 210, because the oxygen concentration in the atmosphere is approximately 21%, the oxygen concentration in the heating tube 210 would be 210,000 ppm. Moreover, because the impurities in the gas when highly pure helium gas of 99.99995% purity is supplied to the second gas supply means 212 and the impurity concentration would be 0.00005%, this corresponds to a calculated 0.5 ppm of impurities, and those impurities are generally, hydrogen, nitrogen, oxygen, carbon monoxide, carbon dioxide and water and the like.

In the event that a degree of vacuum in the heating tube of 1000 [Pa] is achieved using the second pump means 232, because atmospheric pressure is 101,330 [Pa], this corresponds to a pressure reduction to approximately 1/100 in the heating tube 210. The remaining oxygen concentration in the heating tube 210 when this is considered in terms of the partial pressure of oxygen is 210,000 ppm÷100=2100 ppm. The operating valve of the pump means 231 is closed off in this state, and the gas supply valve 211 is opened and highly pure helium gas is supplied from the second gas supply means 212 and flushed through the heating tube 210 until the pressure is returned to atmospheric pressure and the impurity concentration including oxygen in the heating tube 210 reaches 2100 ppm+0.5 ppm=2100.5 ppm.

There is repetition of the operations from vacuum evacuation of the interior of the heating tube 210 to the induction of highly pure helium gas and the concentration of impurities including oxygen in the interior of the heating tube 210 after the second operation is 2100.5 ppm÷100+0.5 ppm=21.505 ppm. In the third operation, it became 21.505 ppm÷100+0.5 ppm=0.715 ppm. In the fourth operation, it became 0.715 ppm÷100+0.5 ppm=0.507 ppm. The moisture concentration at the dew point of −80° C. is 0.54 ppm, and in the above described concentration of impurities of 0.507 ppm because it is the concentration including substances other than water, even if the achievable degree of vacuum of a vacuum pump is of the order of 1000 [Pa] is used, the achievement of below a dew point of −80° C. was easily achievable, moreover by the inclusion of an oxygen trap or a moisture trap and the like during the gas supply piping, the enablement of a further lower dew point and lower oxygen concentration environment of the atmosphere in the heating tube 210 is enabled.

In this embodiment, a mass spectrometry means which is not illustrated in the figures is connected via a capillary tube and a joint 230 with a three directional closure valve attached on the opposite side to the sample preparation means 10 in respect of the heating tube 210. By means of this type of configuration, by the gas emanating from the samples in the thermal analysis being subjected to the conduct of mass spectrometry ("MS") measurement by induction to a mass spectrometer means, the identification of the gas is enabled. Moreover, not limited to this embodiment, a configuration wherein the gas emitted from the samples during thermal analysis is inducted to a gas chromatography mass spectrometry means (GC/MS) or a Fourier transform infrared spectrometry means (FT-IR) may also be enabled.

The thermal analysis control means 201 conducts the control of the heating means 220, the second gas supply means 212, the gas supply valve 211, the second pump means 232, the pump means operating valve 231 and the joint 230 with an attached closure valve and the like. All of the process in respect of the thermal analysis control means 201, for example, by the execution of the specific programs recorded in the memory means which are not illustrated by the central processing unit (CPU) or digital signal processor (DSP) provided in the thermal analysis control means 201 are enabled by the implementation of software processing. However, not limited to this embodiment, all of the processes, for example, may also be configured so as to be implemented by hardware processing, for example, by means of application-specific integrated circuits (ASIC), programmable logic devices (PLD) or field programmable gate arrays (FPGA).

In this embodiment, there is the provision of a system control means 1 controlling both of the box control means 101 and the thermal analysis control means 201. The system control means 1, for example, is enabled by software processes by means of the execution of control programs read-out from memory means which are not illustrated in a personal computer (PC) at the central processing unit (CPU). However, not limited to this embodiment, the system control means 1 may be configured so as to implement hardware processing. Moreover, the system control means 1 may integrate either of the box control means 101 or the thermal analysis control means 201, or both of them.

Next, by means of the execution of the control programs by the operators, the system control means 1 closes the gate means 111, and operates the first pump means 170 via the box control means 101, and after gas exhaustion of the sample preparation means 10 to a specific degree of vacuum, conducts the supply of an inert gas with a low dew point temperature to the interior space to conduct the substitution with a vacuum gas to an atmospheric pressure. As the inert gas with said low dew point temperature, nitrogen or argon are preferable. Helium may also be employed. By repeating this vacuum gas substitution, a specific number of times, the atmosphere in the sample preparation means 10 may be achieved and sustained at a specific atmosphere (Step S101 in FIG. 4). That previously described specific degree of vacuum is preferably a degree of vacuum reaching below 1000 [Pa], and it is even more preferable that the achieved degree of vacuum be lower than 125 [Pa].

Firstly, the system control means 1 closes the gate means 111 by the operator executing the control program via the box control means 101, and the first pump means 170 is operated, and after gas exhaustion of the sample preparation means 10 to a specific degree of vacuum, there is supply to the interior space of a low dew point inert gas to return to atmospheric pressure. As said low dew point inert gas, nitrogen or argon are preferable. Helium may also be used.

The atmosphere of the sample preparation means 10 reaches a specific dew point and is sustained thereafter (step S101 in FIG. 4), by means of repeatedly substituting with this vacuum gas a specific number of times. Said specific degree of vacuum is preferably a degree of vacuum of below 1000 [Pa], and reaching a degree of vacuum of less than 125 [Pa] is even more preferable.

When said specific number of times is to cause the dew point to be lower than −80° C., and the degree of vacuum to be achieved is below 125 [Pa], it is preferably three or more times, when the degree of vacuum is in excess of 125 [Pa] and up to 1000 [Pa], it is preferably four or more times. What is referred to here as a specific atmosphere is preferably a dew point which is less than −40° C., and a dew point of less than −60° C. is even more preferable, and a dew point temperature appropriate to the analysis of leading-edge materials, such as battery materials, is most preferably less than −80° C. Moreover, in order to have the atmosphere in the sample preparation means 10 as an appropriate specific atmosphere sustained for a long period, it may be connected to a gas circulation precision device for use thereon.

The pressure and dew point temperature in the later described heating tube 210 is preferably caused to be the same pressure and dew point temperature as within the sample preparation means 10. By this means, when the atmosphere in the inner space of the sample preparation means 10 is affected by the atmosphere of the heating tube 210 side, such as when the samples are changed out, there is no great variation. Therefore, when multiple samples are sequentially supplied to the thermal analysis means 20, the efficient conduct of thermal analysis in a short period of time is enabled.

Now, making the pressure in the heating tube 210 equivalent to the pressure in the sample preparation means 10, for example, sometimes could be making both the pressure in the heating tube 210 and the pressure in the sample preparation means 10 be atmospheric pressure. Moreover, making the dew point in the heating tube 210 equivalent to the dew point in the sample preparation means 10, for example, could sometimes mean making the dew point temperature in the heating tube 210 be below the dew point temperature in the sample preparation means 10. By means of this configuration, even if the gate means 111 is opened, the atmosphere in the sample preparation means 10 is not disturbed by means of the atmosphere within the heating tube 210.

Now, on the occasion of drawing the vacuum in the sample preparation means 10, in order to implement operations in the sample preparation means 10, the glove attached to the walled means 110 should not be sucked into the interior of the sample preparation means, and a structure is prepared so as to enable a similar vacuum to be drawn from the exterior means of that glove, and when the sample preparation means 10 is returned to atmospheric pressure by gas substitution, the preparation of a mechanism enabling the induction of a similar gas even into the exterior part of the glove is implemented in a generalized vacuum glove box, and the operations thereafter are omitted for being obvious.

In this embodiment, the sample preparation means 10 for the purposes of conducting the operations of processing the samples and the like, there is a necessity to make the capacity of the interior space large. For that reason, once the atmosphere is disturbed in the interior of the sample preparation means 10, it is necessary to reestablish the vacuum, and there are times when achieving a specific atmosphere takes a long time. In this embodiment, the atmosphere of the heating tube 210 side is adjusted so as to match that of the sample preparation means 10 side, so as to not affect as far as possible the atmosphere in the sample preparation means 10 which has a large capacity.

Now, the operator may operate the first pump means 170, and directly manually operate the first gas supply means 171 and the gas supply valve 172, to prepare the specific atmosphere in the inner space of the sample preparation means 10, without depending on the system control means 1 or the control of the box control means 101.

The atmosphere in the inner space of the sample preparation means 10 can be detected, for example, by using the measured values of the dew point sensor measuring the dew point in the interspace, and an oxygen concentration sensor, a pressure sensor measuring the degree of vacuum or a flux sensor measuring the gas flux flowing in the interior space of the sample preparation means 10.

Figure 4:
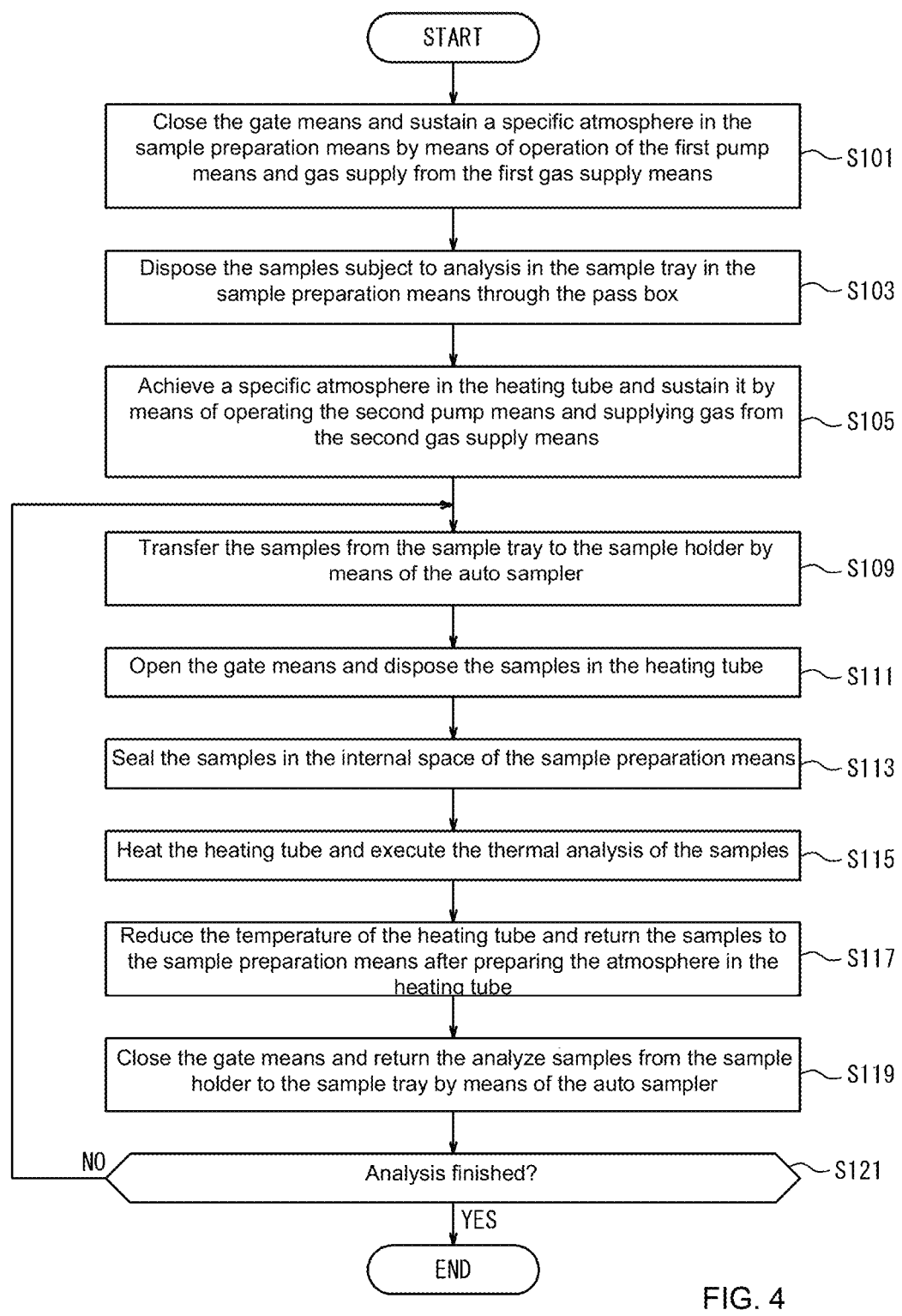
FIG. 4: A flowchart illustrating the implemented procedures of the thermal analysis method of the first embodiment of the present disclosure.

Next, the operator disposes the samples to be subject to analysis in the sample tray in the sample preparation means 10 through the pass box 180 (step S103 of FIG. 4). The disposition of the samples to this sample tray firstly involves the operator opening the outer door of the pass box 180 and inserting the samples into the pass box 180, and the environment in the pass box 180 is prepared using the first pump means 170, the first gas supply means 171 and the gas supply valve 172 by means of an equivalent procedure to conducting the substitution of the vacuum gas. The environment in the pass box on this occasion must have a dew point temperature equivalent to the inner space of the sample preparation means or alternatively lower than that. The detection of the atmosphere in the pass box 180 is enabled using a dew point meter, and oxygen concentration meter, a pressure sensor measuring the degree of vacuum and the like.

When the environment in the pass box 180 achieves its target, the operator inserts the samples into the interior space of the sample preparation means by means of opening the inner door separating the inner space of the sample preparation means 10 from the inside of the Pass box 180. In this embodiment, in order to transport the samples to be subject to analysis by means of the auto sampler 160 to the sample holder 121, the operator may process the samples so as to measure them one-by-one in the interior space of the sample preparation means 10, if required, and one measurement worth of samples is inserted to the sample vessel and disposed in the sample tray of the auto sampler 160. For the processing of the samples on this occasion, other than dividing out the samples into one measurements worth, for example, substances which are to be subject to measurement may be extracted from batteries, including mixing substances to be subject to measurement. By this means, step S103 is completed.

The sample vessels housing the samples are preferably formed of materials with superlative thermal transmission properties, using materials with such a superlative thermal conductivity as to allow the temperature of the bottom surface of the sample vessels to be viewed as substantially the temperature of the samples.

In this embodiment, just as in non-patent reference 1, because the manual method of disposing the heating analysis device in the sample preparation means 10 (glovebox) is not employed, the effective use of the inner space of the sample preparation means 10 in the processing operations of the samples described above is enabled.

When the auto sampler 160 is employed, for example, the operator inserts one measurements worth of samples into the sample vessels using gloves, and may directly dispose them into the sample holder 121. All of the steps in the utilization of the auto sampler 160 in the explanation as follows are the same.

Next, system control means 1 conducts the vacuum gas substitution by operating the second pump means 232, the pump means operating valve 231, the joint 230 with an attached closure valve, the second gas supply means 212 and the gas supply valve 211, via the thermal analysis control means 201, and a specific atmosphere is achieved in the heating tube 210, and this is sustained (step S105 in FIG. 4). What is referred to as a specific atmosphere here is preferably a dew point temperature below −40° C., more preferably a dew point temperature which is below −60° C., most preferably a dew point temperature suited to the analysis of leading-edge materials, such as battery materials, below −80° C. Moreover, the atmosphere in the heating tube 210 preferably is the same as the atmosphere in the internal space of the sample preparation means 10 (the pressure and dew point temperature). Now, the operator may also directly manually operate the user interface such as the second pump means 232, to prepare a specific atmosphere in the heating tube 210, to achieve the same pressure and dew point temperature as the inner space of the sample preparation means 10, without relying on the controls of the system control means 1 or the thermal analysis control means 201.

The gas used for vacuum gas substitution is an inert gas with the low dew point temperature. Nitrogen gas or argon gas may be employed, but helium gas with a dew point temperature lower than −80° C. is preferably employed when connected to the mass spectrometer via the joint 230 with an attached closure valve. However, the operator may directly manually operate at least one of the second pump means 232, the pump means operating valve 231, the joint 230 with an attached closure valve, the gas supply valve 211 and the second gas supply means 212.

The atmosphere in the heating tube 210 may be detected, for example, using the measurement values of the flux sensor measuring the amount of gas flowing in the heating tube 210 and/or a pressure sensor measuring the degree of vacuum, an oxygen concentration meter, or a dew point meter measuring the dew point in the heating tube 210.

Next, the system control means 1 controls the auto sampler 160 via the box control means 101, and transfers the sample vessels containing the samples from the sample tray to the sample holder 121 by means of the auto sampler 160 (step S109 in FIG. 4). The auto sampler 160 sequentially disposes the samples in the sample holder 121 in order to analyze multiple samples at the thermal analysis means 20. The auto sampler 160, for example, sequentially disposes samples in the sample holder 121 while revolving the revolving dais, whereon multiple samples are mounted, by specific angular amounts. However, as already mentioned, the operator may mount one measurement worth of samples into the sample holder 121, without relying on the auto sampler 160.

Next, the system control means 1 opens the gate means 111 via the box control means 101, and as illustrated in FIG. 5, the transfer mechanism 130 is transferred to the thermal analysis means 20 side, to dispose the samples into the heating tube 210 (step S111 in FIG. 4). When the sample holding member 120 is displaced as far as possible in the direction of the terminal means of the thermal analysis means 20 (the leftward direction in FIG. 5), as illustrated in FIG. 5, the sealing tube 142 is fitted into the inner side of the diameter direction of the O-ring 141. By this means, the sample holder 121 is sealed with respect to the inner space of the sample preparation means 10 by means of the open tube 141*a*, the O-ring 141, the sealing tube 142 and the holding base 143 (step S113 in FIG. 4).

Next, the system control means 1 controls the second gas supply means 212, the gas supply valve 211 and the joint 230 with an attached closure valve via the thermal analysis control means 201, not only flushing an appropriate flux amount of gas into the heating tube 210, but also controlling the heating means 220, so as to heat the interior of the heating tube 210 to achieve a specific temperature. Then, the thermal analysis of the samples is executed (step S115 in FIG. 4).

When the thermal analysis is DSC, the thermal analysis system 100 enables the measurement of the potential difference (VA−VB) of the thermocouple element wire 122*a* and the thermocouple element wire 122*b*, in correspondence with the temperature differential ΔT between the sample holder 121 and the reference substance holder 121*b* at the temperature measurement means 300 of FIG. 7. Moreover, the thermal analysis system 100 enables the calculation of the thermal flux differential dΔQ/dt between the reference substance and the samples, from the temperature differential ΔT between the samples and the reference substance. Furthermore, the temperature differential ΔT enables the computation of the amount of heat absorbed (endotherm) Q of the samples by means of the time integration of the temperature differential ΔT.

On the other hand, in the case of DTA, at the temperature measurement means 300 of FIG. 7, the direct detection of the potential difference (VA−VB), corresponding to the temperature differential ΔT between the samples in the sample holder 121 and the reference substance in the reference substance holder 121*b*, is enabled by the shorting of the thermocouple element wire 122*c* and the thermocouple element wire 122*d* (represented by the broken line in FIG. 7) (the establishment of VC=VD) is enabled by the output voltage of the differential amplifier 51.

Next the system control means 1 reduces the temperature in the heating tube 210 by controlling the heating means 220 via the thermal analysis control means 201, and after preparing the atmosphere in the heating tube 210 by means of the second pump means 232 and the like, the transfer mechanism 130 is controlled via the box control means 101 to return the sample holding member 120 into the sample preparation means 10 (step S117 in FIG. 4). What is referred to here as "preparing the atmosphere in the heating tube 210" refers to, for example, causing the pressure and dew point temperature in the heating tube 210 to be the same as the pressure and the dew point temperature in the internal space of the sample preparation means 10. When the sample holding member 120 initiates the displacement to the sample preparation means 10 side by means of the transfer mechanism 130, the fitting to the O-ring 141 to the sealed tube 142 has already been removed, eliminating the seal of the sample holder 121 with respect to the inner space of the sample preparation means 10. By this means, the samples subject to thermal analysis are exposed once more to the atmosphere in the inner space of the sample preparation means 10. By the pressure and the dew point temperature of inside the heating tube 210 having been already caused to be the same as the pressure and the dew point temperature of the inner space of the sample preparation means 10, the atmosphere of the inside of the inner space of the sample preparation means 10 is not disturbed by means of the atmosphere in the heating tube 210. Therefore, no time is required for the purposes of re-establishing the atmosphere in the sample preparation means 10. Moreover, the rapid transition to the next thermal analysis and the like is enabled.

The system control means 1 not only closes the gate means 111 via the box control means 101, it also controls the auto sampler 160, and returns the samples whose thermal analysis is complete from the sample holder 121 to the sample tray (step S119 in FIG. 4).

Then, the system control means 1 either performs the thermal analysis a specific number of times, or confirms if the thermal analysis completed command has been issued (step S121 of FIG. 4), and if YES, then thermal analysis is terminated, and if NO, then there is a return to step S109, and new samples are transferred once more from the sample tray to the sample holder 121 by means of the autosamplers 160.

Figure 8:
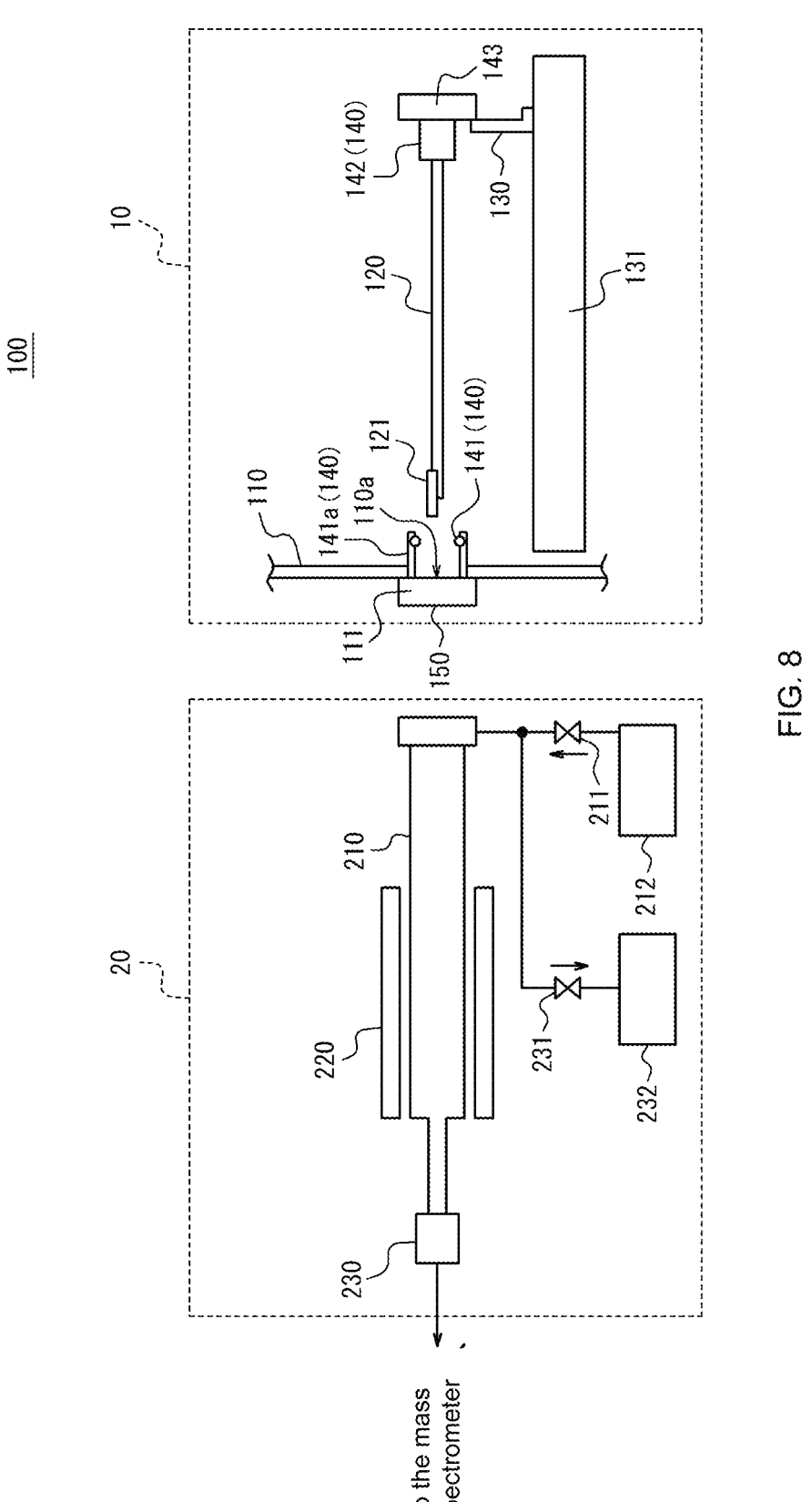
FIG. 8: A drawing illustrating the maintenance state of the thermal analysis system of the first embodiment of the present disclosure.

On the occasion of performing the maintenance of the thermal analysis system 100, as illustrated in FIG. 8, the operator with the gate means 111 in the closed state, the coupling mechanism 150 coupling the heating tube 210 and the gate means 111 is removed and the coupling of both of them is eliminated. By this means, the individual maintenance of the sample preparation means 10 and the thermal analysis means 20 is enabled, the assembly of both of them is changed and they are re-coupled, enabling the restart of the thermal analysis.

As already mentioned above, in this embodiment, it is a thermal analysis system 100 providing a sample preparation means 10 wherein the samples subject to analysis are disposed, and a thermal analysis means 20 conducting thermal analysis of the samples, the sample preparation means 10 comprises a walled means 110 circumscribing an inner space, a gate means 111 which can open and close the aperture means 110a provided in the walled means 110, a sample holder 121 where on samples are mounted, a sample holding member 120 having a temperature sensor 122 measuring the temperature of the samples, a transfer mechanism 130 transferring the sample holder 121 through the aperture means 110a into the thermal analysis means 20, a sealing mechanism 140 sealing the sample holder 121 into the inner space of the sample preparation means 10, and the coupling mechanism coupling the heating tube 210 of the thermal analysis means 20, in a sealed state with respect to the exterior, to the gate means 111, and the thermal analysis means 20 is configured from a heating tube 210 housing the sample holder 121 from the sample preparation means 10, and the heating means 220 heating the heating tube 210 while surrounding the heating tube 210 from the exterior side thereof. By means of employing this type of configuration, the simple performance of thermal analysis while controlling the atmospheric exposure concomitant with sample transfer from the sample preparation means 10 to the thermal analysis means 20 is enabled.

Moreover, in this embodiment, the sample preparation means 10 and the thermal analysis means 20 each provide a first pump means 170 which is the pump drawing vacuum in the internal space on the pass box 180 and the internal space of the sample preparation means 10, and a second pump means 232 which is the pump drawing vacuum in the sample heating tube 210, and a first gas supply means 171 for the purposes of sustaining the dew point temperature of the internal space of the sample preparation means 10 below a specific temperature, and a second gas supply means 212 for the purposes of sustaining the dew point temperature of the inside of the heating tube 210 of the thermal analysis means 20 below a specific temperature. By employing this type of configuration, before the transfer of the samples from the sample preparation means 10 to the thermal analysis means 20, the conduct of the transfer of the samples while sustaining a previously established equilibrated state of the atmospheres of the sample preparation means 10 and the thermal analysis means 20 is enabled, therefore, on the occasion of transferring the samples from the sample preparation means 10 to the thermal analysis means 20, a suppression of the adverse effects imparted to the samples stored in the sample preparation means imparting an effect on the atmosphere inside the sample preparation means 10 is enabled. Moreover, by supplying gas with a dew point temperature below a specific temperature after transfer of the samples into the thermal analysis means 20, the rapid sustaining of a specific dew point temperature in the heating tube 10 is enabled.

Moreover, in this embodiment, the sample holding member 120 additionally comprises the reference substance holder 121b mounting the reference substance adjacent to the samples, and the temperature sensor 122 is configured to be a differential thermal analysis sensor measuring the temperature differential between the samples and the reference substance. By employing this type of configuration, the execution of differential thermal analysis is facilitated, while suppressing atmospheric exposure concomitant with the sample transfer from the sample preparation means 10 to the thermal analysis means 20.

Moreover, in this embodiment, the sample holding member 120 additionally comprises the reference substance holder 121b mounting the reference substance adjacent to the samples, and the temperature sensor 122 is configured to be a differential scanning calorimetry sensor measuring the temperature difference between the samples and the reference substance, as well as the heat flux difference flowing into the samples and the reference substance. By employing this type of configuration, the execution of differential scanning calorimetry is facilitated, while suppressing atmospheric exposure concomitant with the sample transfer from the sample preparation means 10 to the thermal analysis means 20.

Furthermore, in this embodiment, there is the additional provision of a system control means 1 controlling the sample preparation means 10 and the thermal analysis means 20, the system control means 1 is configured to transfer the sample holder 121 into the thermal analysis means 20, while sustaining the pressure and the dew point temperature in the interspace of the sample preparation means 10 and that of the inside of the heating tube 210 to be in an equivalent state. By the employment of this type of configuration, the transfer of the samples can be performed while sustaining the already equilibrated atmospheres of the sample preparation means 10 and the thermal analysis means 20 before transferring the samples from the sample preparation means 10 to the thermal analysis means 20. Therefore, on the occasion of transferring the samples from the sample preparation means 10 to the thermal analysis means 20, the suppression of the imparting of adverse effects on the samples held in the sample preparation means 10 by any effects imparted by the atmosphere of the sample preparation means is enabled. Moreover, the atmosphere in the heating tube 210 enables the rapid transition to an atmosphere suited to the thermal analysis of the samples.

In addition, in this embodiment, the system control means 1 is configured to transfer the sample holder 121 to inside of the sample analysis means 20, while sustaining the dew point temperature in the internal space of the sample preparation means 10 and in the heating tube 210 at a state below $-80°$ C. By the employment of this type of configuration, on the occasion of transferring the samples, while suppressing the adverse impact imparted to the samples held in the sample preparation means 10 when transferring the samples, the rapid implementation of the thermal analysis under an atmosphere suited to the thermal analysis of leading-edge materials, such as battery materials and the like, after the transfer of the samples is enabled.

Moreover, in this embodiment, sample preparation means 10 comprises an auto sampler 160 changing in and out the samples in the sample holder 121, and a sample tray holding multiple samples, the auto sampler 160 transfers the samples from the sample tray to the sample holder 121, and is configured so as to sequentially supply multiple samples to the sample holder 121 by returning the thermally analyzed samples from the sample holder 121 to the sample tray. By the employment of this type of configuration, the efficient conduct of thermal analysis of multiple samples is enabled, even if the operator does not perform operations one-by-one in the thermal analysis.

In addition, in this embodiment, as it is a thermal analysis method by means of a thermal analysis system 100 configured comprising a sample preparation means 10 wherein the samples which are the subject of analysis are disposed, and a thermal analysis means 20 conducting the thermal analysis of the samples, the sample preparation means 10 comprises a walled means 110 circumscribing an internal space, a gate means 111 which can open and close the aperture means 110a provided in the walled means 110, a sample holder 121 mounting the samples, a sample holding member 120 having a temperature sensor 122 measuring the temperature of the samples, a transfer mechanism 130 transferring through the aperture means 110 into the thermal analysis means 20, and a sealing mechanism 140 sealing the sample holder 121 into the inner space of the sample preparation means 10, and a coupling mechanism 150 coupling the heating tube 210 of the thermal analysis means 20, in a sealed state with respect to the exterior, to the gate means 111, and the thermal analysis means 20 comprises the heating tube 210 housing the sample holder 121 from the sample preparation means 10, and the heating means 220 heating the heating tube 210 while surrounding the heating tube 210 from the exterior thereof, and in the state where the dew point temperature and pressure of the inner space of the sample preparation means 10 and of the interior of the heating tube 210 are sustained in an equivalent state, there is the inclusion of a step wherein the sample holder 121 is transferred into the thermal analysis means 20. By employing this type of configuration, the thermal analysis can be easily executed while suppressing the atmospheric exposure concomitant with the sample transfer from the sample preparation means 10 to the thermal analysis means 20. Moreover, before transferring the samples from the sample preparation means 10 to the thermal analysis means 20, the conduct of the equilibration and sustenance of the atmospheres of the sample preparation means 10 and of the thermal analysis means 20 is enabled before transferring the samples. Therefore, on the occasion of transferring the samples from the sample preparation means 10 to the thermal analysis means 20, the suppression of adverse effects on the samples stored in the sample preparation means 10 affecting the atmosphere in the sample preparation means 10 is enabled [sic]. Furthermore, the atmosphere in the heating tube 210 can be rapidly transitioned to an atmosphere suited to the thermal analysis of the samples.

Next, an explanation is provided in respect of the thermal analysis system of the first modified embodiment of this embodiment. In this first modified embodiment, compared to the previous embodiment, other than the sample holding member 120 configuring a horizontal-balance mechanism 125, it closely resembles the configuration of the embodiment described above. Therefore, the explanation here is centered on the points of difference from the embodiment described above.

Figure 9:
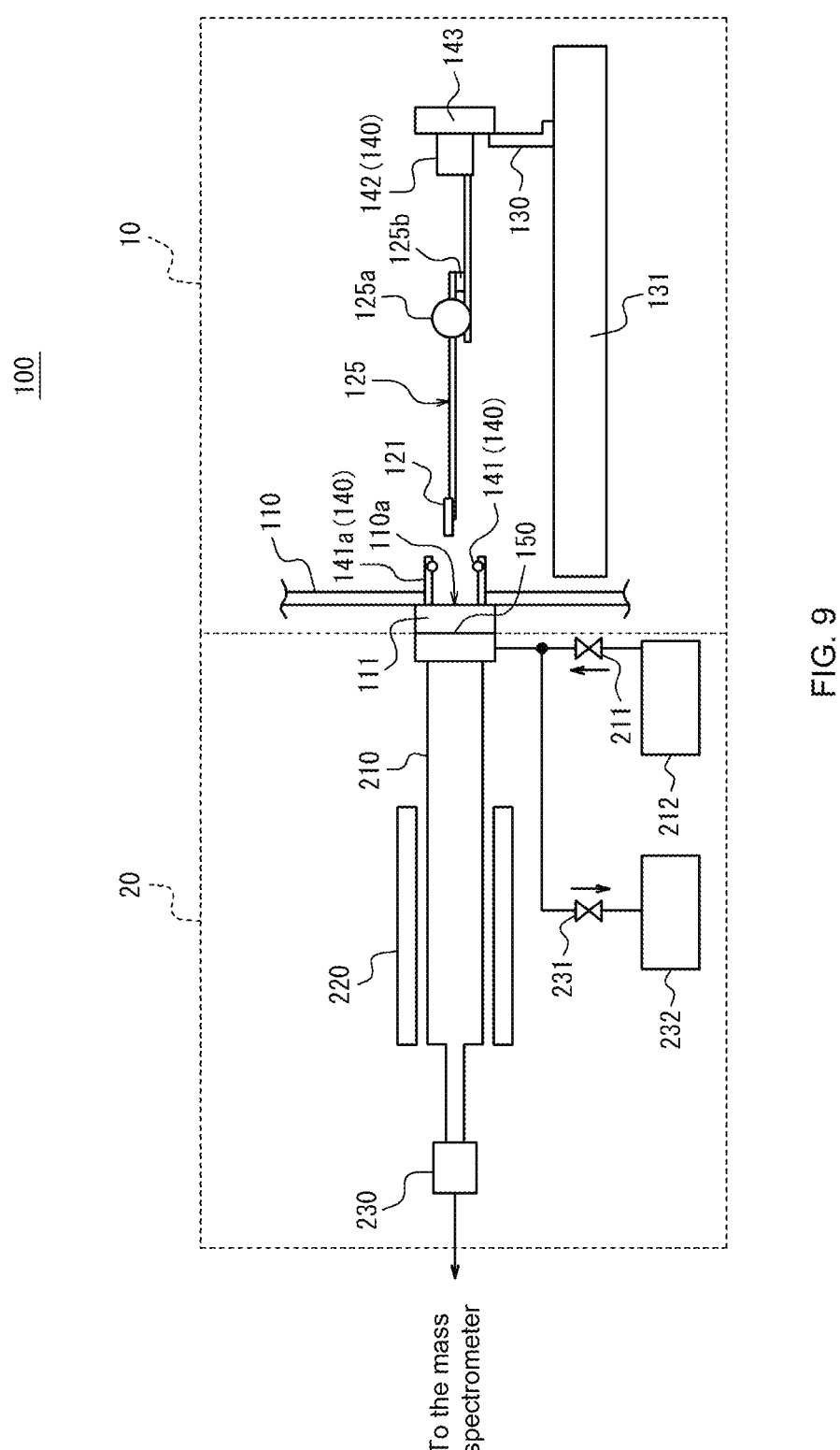
FIG. 9: A drawing illustrating the configuration of the mechanism parts of the thermal analysis system of a modified first embodiment of the present disclosure.

The thermal analysis system 100 of the first modified embodiment of the embodiment described above, as illustrated in FIG. 9, comprises a horizontal-type balance mechanism 125 enabling the measurement of the weight of samples, which is provided protruding to the thermal analysis means 20 side from the holding base 143. This horizontal-type balance mechanism 125 comprises the sample holder 121 disposed on the tip terminal means (the left side terminus in respect of FIG. 9), the moving coil 125a driving so as to sustain the tip terminal means of the horizontal-type balance mechanism 125 horizontally, and the position detector 125b detecting the posture of the horizontal type balance mechanism 125.

When the horizontal type balance mechanism 125 is in the state disposed in the heating tube 210, the wiring from the horizontal type balance mechanism 125 is led to the inner space of the sample preparation means 10 through the interior of the coupling mechanism 150 and the sealing mechanism 140.

In this embodiment, there is no reference substance holder 121b provided in the vicinity of the sample holder 121, but there is the provision of the temperature measurement contact point 124a, illustrated in FIG. 6, below the sample holder 121. By input from the thermocouple element wire 122a and the thermocouple element wire 122c configuring the temperature measurement contact point 124a to the temperature measurement means 300, the derivation of a potential difference (VA−VC) is enabled in correspondence with the temperature of the sample holder 121.

The box control means 101 acquires the position detection result from the position detector 125b, and drives the moving coil 125a so as to sustain the horizontal status of the tip terminal means of the horizontal type balance mechanism 125. Then, the variation in the weight of the sample mounted on the sample holder 121 is detected from the variation in the drive current applied to the moving coil 125a, and the thermal gravimetric analysis (TG) is executed.

Next, the second modified embodiment of the embodiment described above is explained. In the second modified embodiment, in addition to the horizontal-type balance mechanism 125 of the first modified embodiment, a configuration is provided adding a horizontal-type balance mechanism 125B arrayed in parallel with the horizontal-type balance mechanism 125, constituting another one in the vertical direction depth side of the paper surface of FIG. 9.

The horizontal-type balance mechanism 125B (not illustrated in the figures) added on the depth side comprises a reference substance holder 121b (not illustrated in the figures) disposed on the tip terminal means thereof, a second moving coil 125a driving so as to sustain the tip terminal means of the horizontal type balance mechanism 125B horizontally, and a second position detector 125b detecting the posture of the horizontal type balance mechanism 125B.

In the second modified embodiment, there is the provision of the temperature measurement contact point 124b illustrated in FIG. 6, below the reference substance holder 121b. By inputting the thermocouple element wire 122d and the thermocouple element wire 122b constituting the temperature measurement contact point 124b to the temperature measurement means 300, the derivation of a potential difference (VB−VD) corresponding to the temperature of the reference substance holder 121b is enabled.

The box control means 101 acquires the position detection results from each of the position detectors of each horizontal-type balance mechanism 125 and 125B, and drives each of the moving coils 125a so as to sustain the tip terminal means of each of the horizontal type balance mechanisms 125 and 125B horizontally. Then, the differential of the drive current applied to each of the moving coils 125a are used to detect the weight difference between the sample mounted on the sample holder 121 and the weight of the reference substance to execute the differential thermograviometric analysis.

As mentioned above, in this embodiment, the sample holding member 120 comprises a horizontal-type balance mechanism 125 enabling the measurement of the weight of the samples, and the wiring from the horizontal type balance mechanism 125 is configured so as to be led into the inner space of the sample preparation means 10 through the coupling mechanism 150 and the inner side of the sealing mechanism 140. By the employment of this type of configuration, the facilitated execution of the thermogravimetric analysis is enabled while suppressing exposure to the atmosphere in tandem with the transfer of the samples from the sample preparation means 10 to the thermal analysis means 20.

Moreover, in this embodiment, the sample holding member 120 comprises two horizontal type balance mechanisms 125 and 125B arrayed in parallel, and one of the two horizontal type balance mechanisms 125 and 125B is the sample holder 121, and the other houses the reference substance holder 121b, and are configured to detect the weight difference of the sample and the reference substance as the differential type thermogravimetric signal. By the employment of this type of configuration, the facilitated execution of the thermogravimetric analysis is enabled while suppressing exposure to the atmosphere in tandem with transfer of the samples from the sample preparation means 10 to the thermal analysis means 20.

Figure 10:
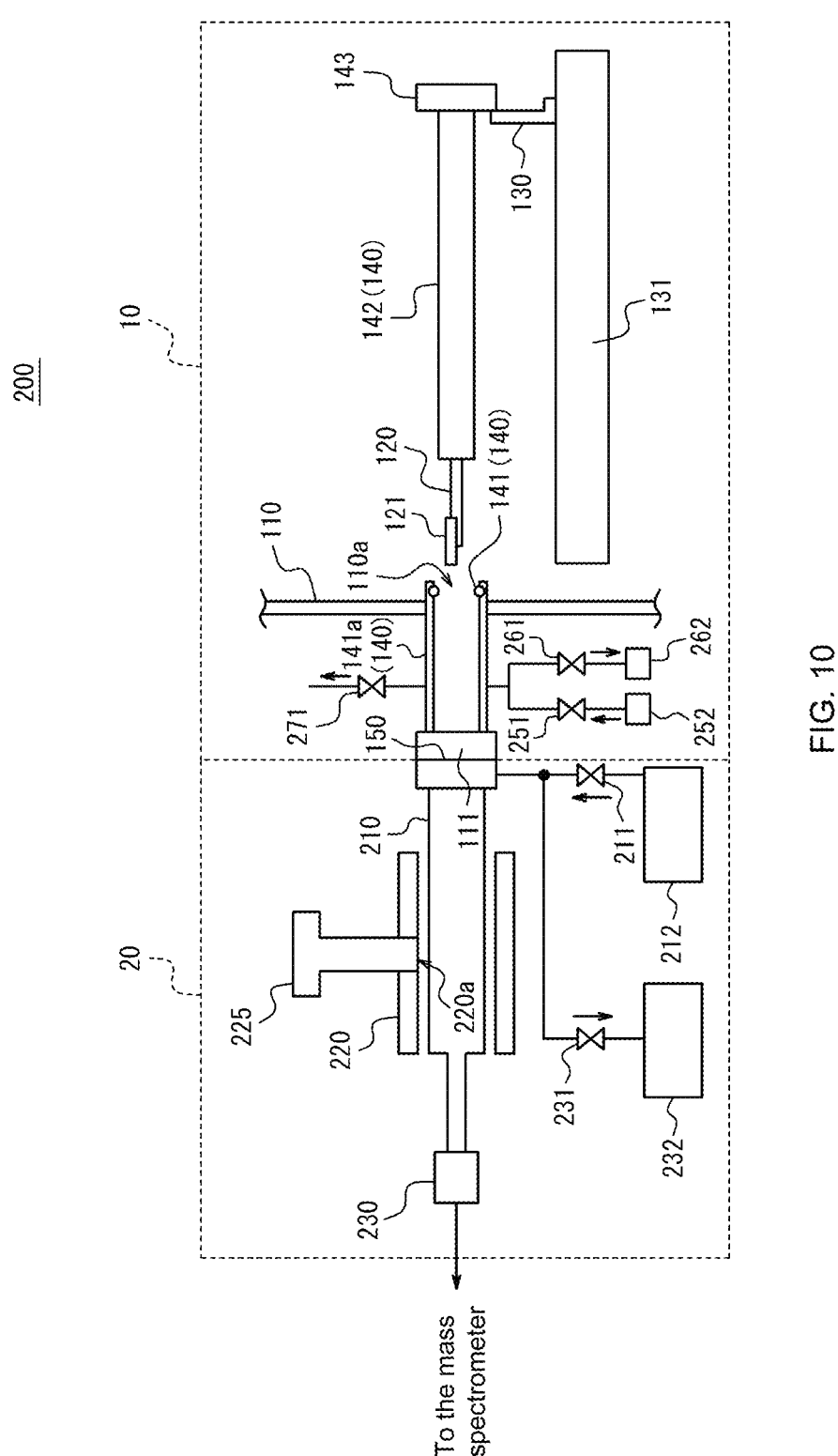
FIG. 10: A drawing illustrating the configuration of the mechanism parts (sample preparation position) of the thermal analysis system of the second embodiment of the present disclosure.

Next, the thermal analysis system 200 of the second embodiment of this disclosure is explained using FIGS. 10 to 13. FIG. 10 is a diagram representing the configuration of the mechanistic parts of the thermal analysis system 200 of this embodiment. The thermal analysis system 200 of this embodiment, just as was the case with the first embodiment, configures a sample preparation means 10 whereon samples subject to analysis are disposed, and a thermal analysis means 20 conducting the thermal analysis of the samples.

However, this embodiment, compared with the first embodiment, resembles a configuration of the first embodiment, other than (1) the open tube 141a is configured to go over the sample preparation means 10 extending to the outer side (the left side of FIG. 10), (2) in this standby position disposing the sample holder 121 in the open tube 141a, in order for the outer surface of the sealing tube 142 to fit into the O-ring 141, compared to the first embodiment, the axial direction length of the sealing tube 142 is lengthened, (3) the interior of the open tube 141a is configured in respect of the outer side of the walled means 110 to enable vacuum drawing gas supply, and (4) the provision of the through hole 220a for insertion of the observation window 225 for confirming the position of the sample holder 121 housed in the heating tube 210.

Figure 11:
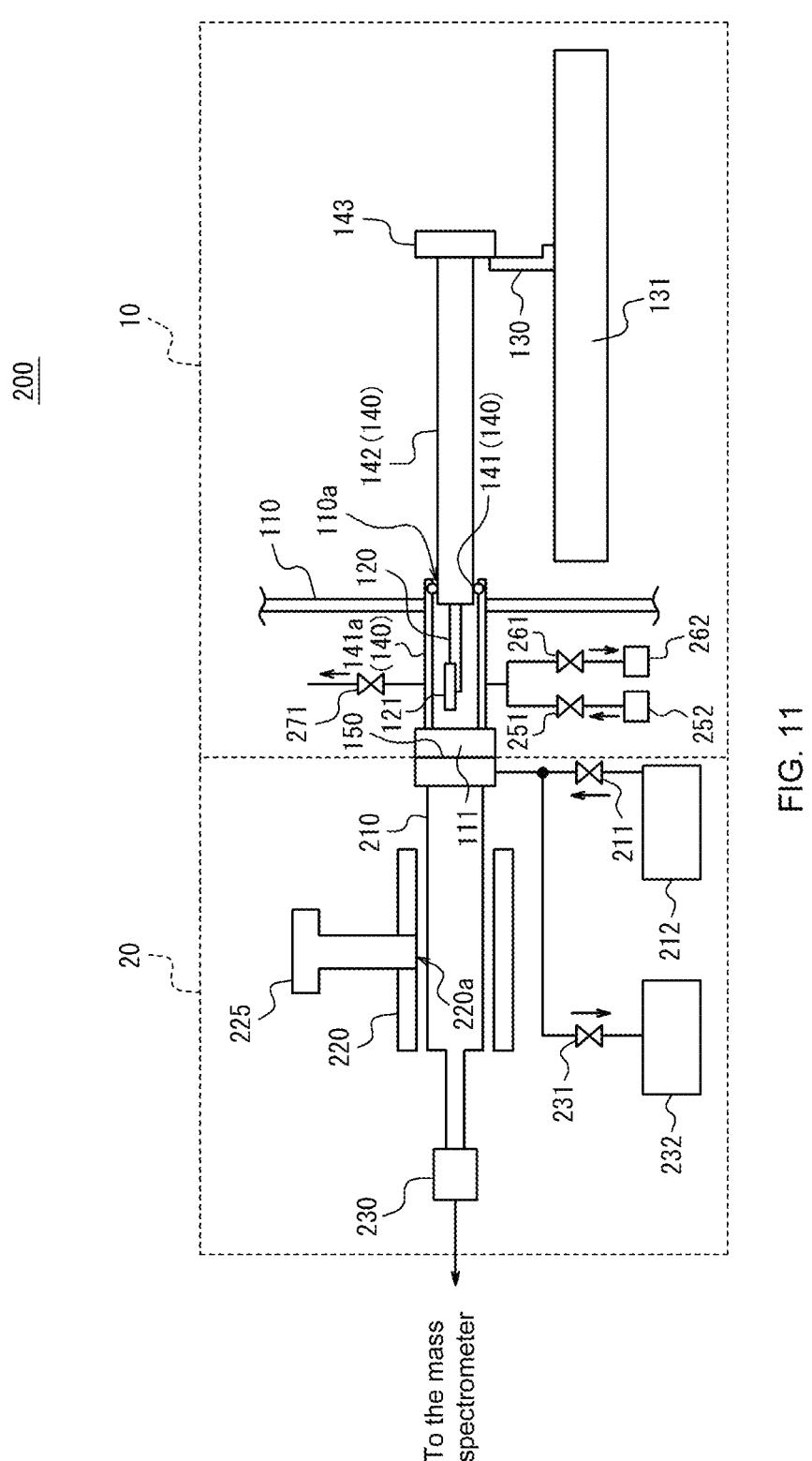
FIG. 11: A drawing illustrating the configuration of the mechanism parts (standby position) of the thermal analysis system of the second embodiment of the present disclosure.
Figure 12:
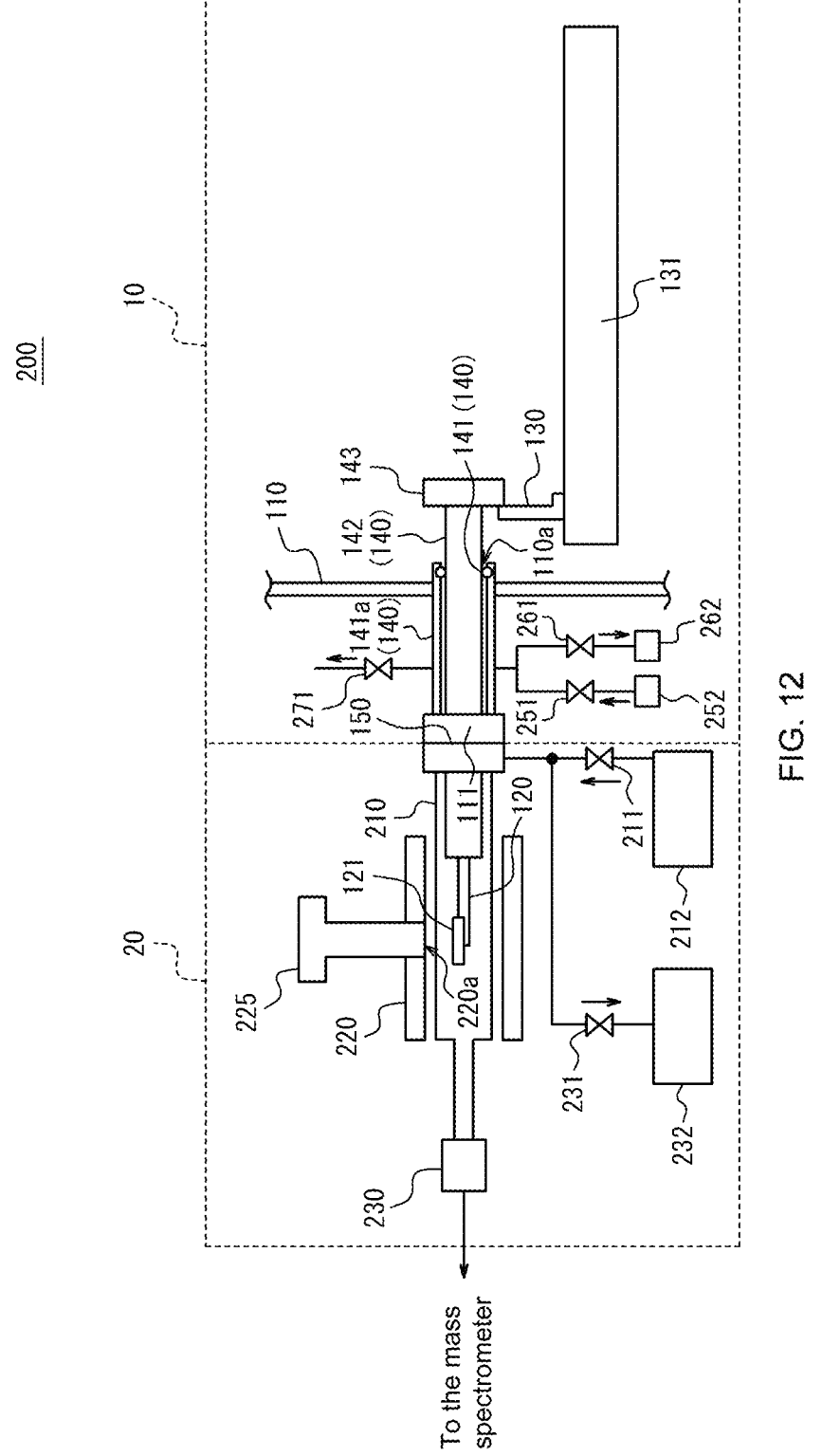
FIG. 12: A drawing illustrating the implementation state of the thermal analysis using the thermal analysis system (thermal analysis device) of the second embodiment of the present disclosure.

In this embodiment, the sample holder 121 has any one of the three determined positions which are the sample preparation position for the conduct of the preparation for mounting samples on the sample holder 121 as illustrated in FIG. 10, and the standby position for standby on the occasion of transfer of the sample holder 121, as illustrated in FIG. 11, from the sample preparation means 10 to the thermal analysis means 20 or for transfer from the thermal analysis means 20 to the sample preparation means 10, and the thermal analysis position conducting the thermal analysis disposing the sample holder 121, as illustrated in FIG. 12, into the thermal analysis means 20.

The sample preparation means 10 comprises the walled means 110 circumscribing an inner space, the gate means 111 enabling the opening and closing of the aperture means 110a provided in the walled means 110, the sample holding member 120 having the sample holder 121 whereon samples are mounted, the transfer mechanism 130 transferring the sample holder 121 through the aperture means 110a into the thermal analysis means 20, the sealing mechanism 140 sealing the sample holder 121 into the inner space of the sample preparation means 10, when transferring the sample holder 121 into the thermal analysis means 20, the coupling mechanism 150 coupling the heating tube 210 of the thermal analysis means 20 to the gate means 111 in a sealed state with respect to the exterior, the first pump means 170 (refer to FIG. 2) in order to draw vacuum into the inner space, the first gas supply means 171 and the gas supply valve 172 for inducting gas after creation of the vacuum, the auto sampler 160 changing in and out the samples in the sample holder 121, the temperature measurement means 300 conducting the temperature measurement of the samples using the temperature sensor 122 in the sample holding member 120, and the box control means 101 controlling the operations of the sample preparation means 10. Moreover, just as in the first embodiment, the sample preparation means 10 has the additional provision of the so-called pass box 180 separating the inner space and the walled means 110.

There is the provision in the walled means 110 of an open tube 141a extending from the proximal edge means of the aperture means 110a on the inner space side of the sample preparation means 10 (the right side in FIG. 10) to the outer side of the walled means 110 (the left side of FIG. 10), and the provision of the O-ring 141 sealing the sample holder 121, by fitting-in the outer surface of the sealing tube 142 thereto, into the inner space of the sample preparation means 10.

In other words, in this embodiment, the aperture means 110a is an aperture formed in the walled means 110, and the gates means 111 is fitted onto the outer side terminus of the open pipe 141a protruding to the outer side from the aperture means 110a (the left terminus in respect of FIG. 10). The aperture means 110a can be opened and closed by means of the gate means 111.

As illustrated in detail in FIG. 3, the sample holding member 120 comprises the holding arm 120a towards the thermal analysis means 20, the sample holder 121 and the reference substance holder 121b disposed adjacent to the heatsink 121h of the tip terminus of the holding arm 120a (the left side terminus in FIG. 10), and the holding base 143 fixing the base of terminus of the holding arm 120a (the right side terminus in FIG. 10). The sample holding member 120 is fixed on the movable side of the transfer mechanism 130 by means of the holding base 143.

The sealing tube 142 is integrally formed from stainless steel with the holding base 143 protruding towards the sealing tube 142 (The leftward direction in FIG. 10). In this embodiment, the sealing tube 142 has a cylindrical shape, and the holding arm 120a extends in the tip terminal side thereof through the tip terminal aperture. In other words, the base terminal means of the holding arm 120a of the sample holding member 120 is surrounded on the outside by the sealing tube 142.

In this embodiment, compared with the first embodiment, the axial direction length of the sealing tube 142 is made longer for the purposes of fitting-in of the outer surface of the sealing tube 142 to the O-ring 141 in this standby position (refer to FIG. 11) positioning the sample holder 121 in the open tube 141*a*.

In this embodiment, in the standby position before thermal analysis and after thermal analysis is completed (refer to FIG. 11) and in the position during thermal analysis measurement (the thermal analysis position, refer to FIG. 12), the outer peripheral surface of the sealing tube 142 fits in to the O-ring 141 provided on the inner surface of the open tube 141*a*, blocking off the sample holder 121 from the atmosphere in the inner space of the sample preparation means 10. Because the outer surface of the sealing tube 142 fits-in to the O-ring 141 in both of the positions of the standby position and the thermal analysis position, the axial length of the sealing tube 142 is longer compared with the first embodiment. In this embodiment, the sealing tube 142, the open tube 141*a* and the O-ring 141 configure the sealing mechanism sealing the sample holder 121 in the inner space of the sample preparation means 10.

In the standby position illustrated in FIG. 11, the sample holder 121 is sealed with respect to the inner space of the sample preparation means 10 by means of the above-described sealing mechanism 140. In the standby position illustrated in FIG. 11, by the gate means 111 being closed, the inner space of the open tube 141*a* is sealed off with respect to both of the inner space of the sample preparation means 10 and the heating tube 210 of the thermal analysis means 20, enabling the formation of a small space.

As illustrated in FIG. 10, the open tube 141*a* is provided with a third gas supply means 252 supplying gas to the inner part of the open tube 141*a*, and the third pump means 262 drawing a vacuum in the inner means of the open tube 141*a*.

In this standby position illustrated in FIG. 11, when the sample holder 121 of FIG. 10 is transferred from the state in the inner part of the sample preparation means 10 to the standby position illustrated in FIG. 11, in the pre-thermal analysis measurement state, because the inner space of the open tube 141*a* is in a state with respect to both of the inner space of the sample preparation means 10 and the heating tube 210 of the thermal analysis means 20, basically the dew point of the interior is maintained equivalent to the interior of the sample preparation means 10. In a procedure similar to the procedure represented in the first embodiment, with this state, the process of the substitution of the vacuum gas of the heating tube 210 is enabled. At the point in time when the pressure and the dew point inside of the heating tube 210 reach the equivalent of the atmosphere in the interior of the sample preparation means 10, while continuing the supply of gas from the second gas supply means 212, by opening the joint 230 with an attached closure valve, the sustenance of the dew point in the heating tube 210 equivalent to that of the interior space of the open tube 141*a* and the interior of the sample preparation means 10 is enabled.

In a state with equivalent pressure and dew points in the interior of the heating tube 210 and the inner space of the open tube 141*a*, not only is the gate means 111 opened, the transfer mechanism 130 is driven to transfer the sample holder 121 into the heating tube 210, for the disposition of a status for the thermal analysis execution represented in FIG. 12. Also, at this time, because the outer peripheral surface of the sealing tube 142 continues to be fitted in to the O-ring provided on the inner surface of the open tube 141*a*, the atmosphere of the interior space of the sample preparation means continues to be blocked off from that of the sample holder 121. On the other hand, on the occasion of this transfer, the gas pressure, pushed into the heating tube

210 from within the sealing tube 142 when transferred together with the sample holder 121, can escape because the joint 230 with an attached closure valve of the tip terminus of the heating tube 210 is open, with the result that the prevention of a variation in the dew point is enabled.

By means of this configuration, the performance of thermal analysis of the innards of the heating tube 210 of the thermal analysis means 20, which is sealed state in respect of the inner space of the sample preparation means is enabled. The preparation of the atmosphere in the heating tube 210 during the thermal analysis measurements is mainly performed by means of the supply of gas by means of the second gas supply means 212, but it is preferable that there is the conduct of the supply of gas by means of the third gas supply means 252 provided in the open tube 141*a*, opening the atmosphere release valve 271 to cause gas flow. However, it is also possible to stop the gas supply from the third gas supply means 252, with the atmosphere release valve 271 closed.

The procedures after the thermal analysis is completed will now be explained. At the point in time when the temperature has dropped to near room temperature, the joint 230 with an attached closure valve and the gas supply valve 251 are closed off, halting the supply of gas from the third gas supply means 252. In a procedure similar to the procedure represented in the first embodiment with this state, there is the conduct of vacuum gas substitution of the inner part of the heating tube 210, equalizing the pressure and dew point of the inside of the heating tube 210 to that of the atmosphere of the internal space of the sample preparation means 10. When at this point in time gas is again supplied from the third gas supply means 252, the joint 230 with the closure valve attached thereto is opened, and gas flow is sustained while maintaining the atmospheric pressure in the interior of the heating tube 210. Thereafter, the sample holder 121 is transferred to the sample preparation means 10 side together with the sealing tube 142, and with the return to the standby position of FIG. 11, the gate means 111 is closed. On this occasion, by maintaining the gas flow while maintaining the atmospheric pressure in the interior part of the heating tube 210, transfer is enabled without reducing the pressure in the interior of the heating tube 210 on the occasion of returning the sealing tube 142 to the sample preparation means 10. As a result of this transfer, the internal space of the open tube 141*a* is in a sealed state with respect to the internal space of the sample preparation means 10 and the heating tube 210 of the thermal analysis means 20. At this point, a vacuum is drawn in the open tube 141*a* using the third pump means 262, followed by the conduct of vacuum gas substitution introducing an inert gas with a dew point below −80° C. from the third gas supply means 252. As illustrated in FIG. 11, in this embodiment because a small space is formed in the interior of the open tube 141*a*, by conducting the vacuum gas substitution a number of times, making the pressure and dew point of the inside of the open tube 141*a* equivalent to the atmosphere of the inner space of the sample preparation means 10 is easily enabled.

In this state, the sample holder 121 is transferred together with the sealing tube 142 into the sample preparation means 10 and returned to the state of FIG. 10. Because the internal space of the open tube 141*a* is equivalent to the atmosphere of the internal space of the sample preparation means 10, the atmosphere of the internal space of the sample preparation means 10 is unaffected.

Now, the pump means operating valve 261 and the gas supply valve 251 may be configured by means of three-way valves or multilevel valves, other than the configuration described above.

The third pump means 262 provided in the open tube 141*a* may employ a different pump to the second pump beans 232 provided in the thermal analysis means 20. Moreover, the third pump means 262 may be an identical pump to the second pump means 232, and that pump may draw a vacuum in the interior of the open tube 141*a*, or for example, switchover so as to draw a vacuum in the interior of the heating tube 210 by the switchover between open and closed of the pump means operating valves 231 and 261 configuring the three-way valves.

In the same manner, the third gas supply means 252 provided in the open tube 141*a* may employ a different gas supply means to the second gas supply means 212 provided in the thermal analysis means 20. Moreover, the third gas supply means 252 may employ an identical gas supply means to the second gas supply means 212, and that gas supply means may either supply gas to the interior of the open tube 141*a*, or switchover this supply of gas to the interior of the heating tube 210, for example, by means of conducting the switchover of the opening and closing of the gas supply valves 211 and 251 configuring three-way valves.

The thermal analysis means 20 comprises the heating tube 210 housing the sample holder 121 from the sample preparation means 10, the heating means 220 heating the heating tube 210, by surrounding the heating tube 210 from the outside thereof, and the thermal analysis control means 201 (refer to FIG. 2) controlling the operation of the thermal analysis means 20. The heating means 220, for example, may be a heating furnace covering a heater with thermal insulation material.

In this embodiment, in respect of the thermal analysis position represented in FIG. 12, a through hole 220*a* may be provided for the purposes of confirming the position of the sample holder 121 from the outside, and provided at a position directly above the sample holder 121 in respect of the heating means 220. Then, the tip terminal means of an observation window 225 is inserted in the through hole 220*a* for the purposes of confirming the position of the sample holder 121. An objective lens and the like for the purposes of facilitating the visual observation of the sample holder 121 which is the object of observation may be disposed on the tip terminal means of the observation window 225.

Before thermal analysis, the operator may practice the transfer operations of the sample holder 121 by means of the transfer mechanism 132 to the thermal analysis means 20 side. On the occasion of this practice of the operations, for example, by confirming the position of the sample holder 121 from the observation window 225, they may contrive to halt the sample holder 121 in this substantially center position of the axial direction (the left right direction of FIG. 10) of the heating means 220, by determining the operating position of a microswitch halting the transfer mechanism 130. In the event that the transfer mechanism 130 comprises a stepping motor, the operator may determine the traveling step numbers by means of the stepping motor so as to halt the sample holder 121 at this substantially center position of the axial direction of the heating means (the left right direction of FIG. 10).

However, the operator may manually halt the sample holder 121 by confirming the position at a specific position from the observation window 225, instead of halting the sample holder 121 by means of a microswitch or stepping motor. Furthermore, in the event that the position of the sample holder 121 is automatically confirmed with a configuration halting the sample holder 121 in substantially center position of the axial direction of the heating means 220 (left right direction in FIG. 10), the thermal analysis means 20 may be configured by disposing an image capture means comprised, for example, of a camera main member and a lens means, instead of an observation window 225.

Figure 13:
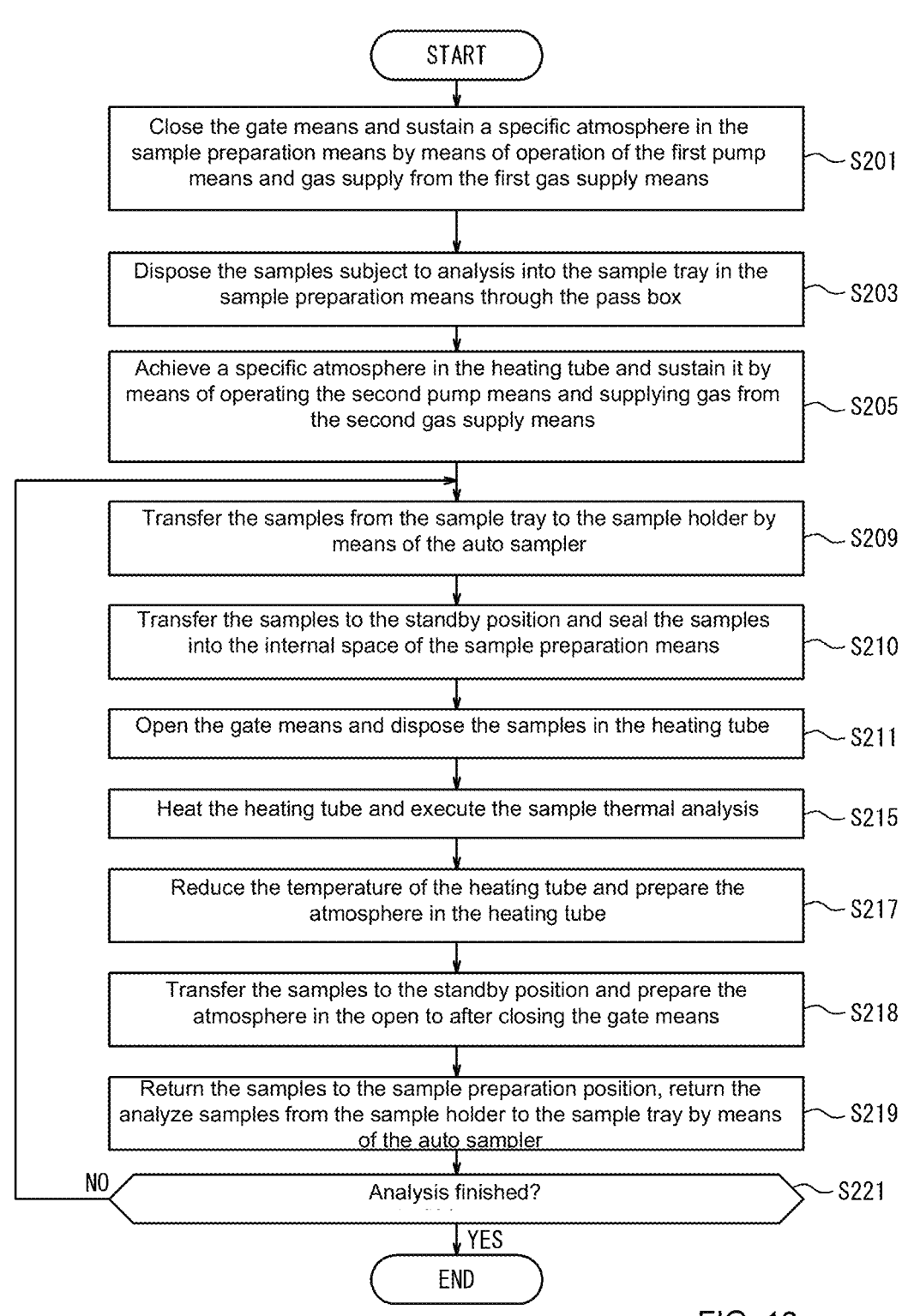
FIG. 13: A flowchart illustrating the implementation procedures of the thermal analysis method of the second embodiment of the present disclosure.

The implementation procedure of the thermal analysis method of this embodiment using the thermal analysis system 200 providing the above-described configuration is explained using FIG. 13 and the like.

Now, the thermal analysis method of this embodiment, when compared to the first embodiment represented in FIG. 4, has a defined position in the standby position of the samples in the sample holder 121 in respect of the steps S210 and step S218, and resembles the first embodiment other than providing the same atmosphere in the internal space of the sample preparation means 10 as the atmosphere of inside of the open tube 141*a* in step S218. Therefore, an explanation is provided centered on the points of difference from the first embodiment.

Because steps S201, S203, S205 and S209 in FIG. 13 are the same steps as steps S101, S103, S105 and S109 in FIG. 4, respectively, further description of them is dispensed with here.

In FIG. 13, system control means 1 controls the auto sampler 160 through the box control means 101, and after transferring the samples from the sample tray to the sample holder 121 (step S209), the samples in the sample holder 121 are transferred to the standby position represented in FIG. 11 (step S210 in FIG. 13). At this standby position, the sample holder 121 and the samples disposed in the interior of the open two 141*a* are disposed in a small space sealed with respect to both the internal space of the sample preparation means 10 and the heating tube 210 of the thermal analysis means 20 (step S210 of FIG. 13).

In step S210, by means of the already established sealed status in the open tube 141*a* which is in the standby position in respect of the internal space of the sample preparation means 10, the suppression of any adverse effects of the atmosphere in the heating tube 210 impacting the internal space of the sample preparation means 10 is enabled, even if in the unlikely event that the atmosphere of the heating tube is contaminated and different from the atmosphere of the internal space of the sample preparation means 10.

Next, in Step S211, the system control means 1 opens the gate means 111 via the box control means 101 and as illustrated in FIG. 12, the transfer mechanism 130 is transferred further to the thermal analysis means 20 side, disposing the samples into the heating tube 210. On that occasion, the escape of the gas pushed in to the heating tube 210 from within the sealing tube 142, by means of the tip terminus of the heating tube 210 pushing open the joint 230 with an attached closure valve, is enabled, with the result that the prevention of the variation of the dew point is enabled.

Next, the system control means 1 controls the heating means 220 via the thermal analysis control means 201, applying heating so that the interior of the heating tube 210 reaches a specific temperature. Then, the thermal analysis of the samples is executed (step S215 of FIG. 13).

When the system control means 1 executes the thermal analysis (step S215), the heating means 220 is controlled via the thermal analysis control means 201 lowering the temperature in the heating tube 210, and the atmosphere in the heating tube 210 is prepared by means of the second pump means 232 and the second gas supply means 212 (step S217 of FIG. 13). What is referred to here as "preparing the atmosphere in the heating tube 210" is equilibrating with the atmosphere in the inner space of the sample preparation means 10. Now, this preparation of the atmosphere in the heating tube 210 is for the purposes of preparing for the next thermal analysis iteration, and is not a preparation required for returning the samples to the sample preparation means 10. However, as laid out in "procedures after completion of thermal analysis", there is a need to supply gas from the third gas supply means 252, and cause gas to flow at atmospheric pressure in the heating tube 210 by opening the joint 230 with an attached closure valve. The reason for that is that on the occasion of the displacement of the sample holder 121 to the standby position in the next step S218, it is for the purposes of enabling transfer into the interior of the heating tube 210 without causing a pressure drop. Thereafter, the gate means 111 is closed in order to separate the atmosphere in the heating tube 210 from the atmosphere in the open tube 141a, enabling the return of the sample holder 121 into the sample preparation means 10 by means of only the atmospheric preparation in the open tube 141a. Therefore, before approximating the atmosphere in the heating tube 210 to the atmosphere in the inner space of a sample preparation means 10, the following step S218 may be executed, and thus a more efficient thermal analysis is enabled thereby.

Via the box control means 101, the system control means 1 transfers the samples in the sample holder 121 by means of the transfer mechanism 130 to the standby position, and after the gate means 111 is closed, the atmosphere in the open tube 141a is prepared (step S218 of FIG. 13). Even in the state where the sample holder 121 has been displaced to the standby position, because the sealing tube continues to be fitted in to the inner side surface of the diameter direction of the O-ring 141, and by means of the closure of the gate means 111, the inner side of the open tube 141a becomes sealed in respect of both of the inner space of the sample preparation means 10 and the heating tube 210 of the thermal analysis means 20. As illustrated in FIG. 11, because the inner side of the open tube 141a has a smaller capacity than the inside of the heating tube 210, the equalization with the atmosphere in the inner space of the sample preparation means 10 is enabled more rapidly than in step S117 of the first embodiment. Moreover, the use of the same type of gas as the type of gas employed on the occasion of preparing the atmosphere in the open tube 141a is enabled.

After the atmosphere in the open tube 141a is prepared in step S218, when the sample holder 121 is displaced further to the sample preparation means 10 side by the transfer mechanism 130, then the fitting-in of the sealing tube 142 to the O-ring 141 is broken, and the samples whose thermal analysis measurements have been completed are once more exposed to the atmosphere in the internal space of the sample preparation means 10. Because the pressure and the dew point temperature in the open tube 141a had already been equalized to the atmosphere in the inner space of the sample preparation means 10, the atmosphere in the inner space of the sample preparation means 10 is not disturbed by the atmosphere of the thermal analysis means 20 side. Therefore, no time is required to restore the atmosphere in the sample preparation means 10. Moreover, rapid transition to the next thermal analysis and the like is enabled.

In this manner, in this embodiment at step S218, with the interior of the open tube 141a in a sustained sealed state with respect to the sample preparation means 10, not only is the sample holder 121 displaced to the standby position, but the gate means 111 is closed off to block the atmosphere in the heating tube 210 from the atmosphere in the open tube 141a. Therefore, the displacement of the sample holder 121 to the standby position before improving the atmosphere in the heating tube 210 is enabled. In this standby position, because the open tube 141a is in a sustained sealed state with respect to both of the heating tube 210 and the sample preparation means a small space is formed in the interior of the open tube 141a, enabling the easy equilibration of the pressure and dew point temperature of the inner space of the sample preparation means 10 by means of the third pump means 262 and the third gas supply means 252. Therefore, not only is a foreshortening of the time required for returning the sample holder 121 from the standby position to the sample preparation position enabled, the suppression of the atmosphere in the interior of the open tube 141a adversely affecting the interior space of the sample preparation means 10 is enabled.

The system control means 1 controls the transfer mechanism 130 via the box control means 101, returning the sample holder 121 and the samples from the standby position to the sample preparation position. Moreover, the system control means 1 controls the auto sampler 160, returning the thermally analyzed samples from the sample holder 121 to the sample tray (step S219 in FIG. 13).

Then, the system control means 1 either performs the thermal analysis a specific number of times, or if there is confirmation that the thermal analysis completed command has issued (step S221 of FIG. 13), and the thermal analysis is terminated in the case of YES, or there is a return to step S209 in the case of NO, and once more new samples are transferred from the sample tray by the auto sampler 162 to the sample holder 121.

As described above in this embodiment (including the first embodiment), the sealing mechanism 140 is provided in the walled means 110 of the sample preparation means 10, and comprises the open tube 141a extending from the proximal edge means of the aperture means 110a to the inner space side of the sample preparation means 10, the annular sealing material is provided on the inner surface of the open tube 141a (O-ring 141), and the basal means of the sample holding member 120 disposing the sample holder 121 on the tip terminus means thereof is surrounded on the outside thereof by the sealing tube 142, and is configured so that the outer peripheral surface of the sealing tube 142 fits in to the inner side surface of the diameter direction of the sealing member. By means of employing this type of configuration, by displacing the sample holding member 120 with the sealing tube 142 provided on the basal means thereof to the thermal analysis means 20 side, the outer surface of the sealing tube 142 fits in to the inner side of the open tube 141a, enabling a sealing of the sample holder 121 with respect to the inner space of the sample preparation means 10. Therefore, effectively with a simple configuration of merely adding a sealing member (O-ring 141), the sealing of sample holder 121 with respect to the inner space of the sample preparation means 10 is enabled.

Moreover, in this embodiment, the open tube 141a extends from the aperture means 110a to the outside of the walled means 110, the gate means 111 is installed in the outer terminal means of the open tube 141a, and in the state where the outer peripheral surface of the sealing tube 142 is fitted into the inner side surface in the diameter direction of the sealing member, by displacing the sample holder 121 by means of the transfer mechanism 130, the sample holder 121 is disposed into the open tube 141a to the standby position, and is configured so that the sample holder 121 is housed in the heating tube 210 in a manner switchable to the thermal analysis position. By means of the employment of this type of configuration, in a state sealed with respect to the inner space of the sample preparation means 10 the sample holder 121 can be switched over between the standby position sealed with respect to the heating tube 210, and the thermal analysis position disposing the sample holder 121 in the heating tube 210. Therefore, after the thermal analysis is completed, by returning the sample holder 121 from the thermal analysis position via the standby position into the sample preparation means 10, without waiting for the pressure and dew point temperature in the heating tube 210 to reach the atmosphere [conditions] of the interior of the sample preparation means 10, enables a suppression of the atmosphere in the heating tube 210 imparting adverse effects on the inner space of the sample preparation means 10 by being passed through the standby position.

Furthermore, in this embodiment, the interior of the open tube 141a is configured in respect of the outer side of the walled means 110 so as to enable drawing of a vacuum therein and/or enabling the supply of gas to the interior of the open tube 141a. By the employment of this type of configuration, when in a state wherein the sample holder 121 is disposed in the standby position, the preparation of the atmosphere in the interior of the open pipe 141a is enabled. Therefore, the effective suppression of the atmosphere in the heating tube 210 imparting any adverse effects on the interior space of the sample preparation means is enabled by passing through the standby position, even if the pressure and the dew point temperature in the heating tube 210 do not match the state within the sample preparation means 10.

Moreover, in this embodiment, the heating means 220 of the thermal analysis means 20 is configured so as to have a through hole 220a for the purposes of confirming the position of the sample holder 121 from outside. By the employment of this type of configuration, on the occasion of practicing the halting position of the sample holder 121 in respect of the interior of the thermal analysis means 20, the conduct of practicing of the halting position is enabled while confirming the halting position of the sample holder 121 in respect of the axial position in the interior of the thermal analysis means 20 by means of the observation window 225 in the through hole 220a or by means of an image capture means. Therefore, an ideal precise halting at the halting position of the sample holder 121 is enabled, even in this situation that the sample holder 121 has to be repaired or replaced by a different functioning sample holder.

In addition, in this embodiment, the sample holder 121 is transferred from the thermal analysis means 20 via a state disposing it in a space (the interior of the open tube 141 a) sealed with respect to either of the interior space of the sample preparation means 10 or the interior of the heating tube 210, configuring an additional return step to the interior space of the sample preparation means 10. By employing this type of configuration, after the thermal analysis is completed, by returning the sample holder 121 via the above described sealed space to the sample preparation means 10, suppression of any adverse effects on the inner space of the sample preparation means 10 by the atmosphere in the heating tube 21 and 10 is enabled, even if the dew point temperature in the heating tube 210 is not equilibrated to the state in the sample preparation means 10.

This disclosure was explained based on multiple figures and embodiments, but it should be noted that a person skilled in the art could easily conduct a variety of modifications are amendments based on this disclosure. Therefore, it should be borne in mind that these modifications are amendments and included in the scope of the present invention. For example, the functions including each of the constituent of parts, and each of the steps and the like could be re-disposed as long as it does not contradict the logic, such as combining multiple constituents of parts or steps in one, or dividing them out.

For example, in the first and second embodiments, there is a configuration where the system control means 1 controls overall the thermal analysis system 100 configured so as to control every functional means via the box control means 101 of the sample preparation means 10 and the thermal analysis control means 201 of the thermal analysis means 20, but there is no limitation to these embodiments. For example, an operator could conduct the operations from an operating panel of the sample preparation means 10 or by operating from a controlled PC, and the box control means 101 good because two control every functional means of the sample preparation means 10 in accordance with these operations. Similarly, the operator could conduct operations via the operational panel of the thermal analysis means 20 or by operating from a controlled PC, so that the thermal analysis control means 201 controls every functional means of the thermal analysis means 20 in accordance with these operations. Furthermore, the operator could also manually control every functional means of the operations of the sample preparation means 10 and/or the thermal analysis means 20.

In addition, in the first and second embodiments, the materials of the thermocouple element wires 122a and 122c, and the thermocouple element wires 122b and 122d were configured using platinum or platinum rhodium, but there is no limitation to these embodiments. The thermocouple element wires could be configured, for example, from tungsten and tungsten rhenium alloys, indium, and indium rhodium alloys, Chromel and Constantan, Chromel and Alumel or Platinel and the like.

Moreover, in the first and second embodiments, configuration was one conducting thermal analysis disposing samples in sample vessels into the sample holder 121, but there is no limitation to these embodiments. The samples could be disposed directly into the sample holder 121.

Furthermore, in the second embodiment, in the standby position, a small space was formed by means of sealing using one O-ring 141 between the double tube structure comprised of the open tube 141a and the sealing tube 142, in a configuration enabling the preparation of the atmosphere in this small space in a very short time, but there is no limitation to this embodiment. For example, it could be a configuration enabling preparation of the atmosphere was sealing the space with two or more between the double tube structure.

The invention claimed is:

1. A thermal analysis system comprising:
a sample preparation apparatus wherein samples subject to analysis are disposed, and a system conducting thermal analysis of the samples,
wherein said sample preparation apparatus includes:
a wall circumscribing an internal space,
an aperture provided in said wall which is an openable and closable gate,
a sample holding member having the samples mounted on a sample holder, and a temperature sensor measuring the temperature of the samples,
a transfer mechanism transferring said sample holder through said aperture into said system conducting thermal analysis,
a sealing mechanism sealing said sample holder in the internal space of said sample preparation apparatus while said sample holder is being transferred into said system conducting thermal analysis, and a coupling mechanism coupling a heating tube of said system conducting thermal analysis to said gate in a sealed state with respect to an exterior of the gate, and wherein said system conducting thermal analysis includes:

said heating tube housing the sample holder from said sample preparation apparatus, and a heater for surrounding said heating tube on the outer side thereof.

2. The thermal analysis system according to claim 1, further comprising a pump drawing a vacuum within said heating tube, and a gas supply in order to sustain a dew point at a specific temperature in said heating tube.

3. The thermal analysis system according to claim 1, wherein said sample holding member comprises a reference substance holder mounting a reference substance adjacent to the samples, and said temperature sensor is a differential scanning calorimetry sensor measuring a temperature difference between the samples and the reference substance, as well as a heat flux difference flowing into the samples and the reference substance.

4. The thermal analysis system according to claim 1, wherein said sample preparation apparatus comprises an auto sampler changing out the samples in said sample holder, and a sample tray holding multiple samples, said auto sampler transfers the samples from said sample tray to said sample holder, returns the thermally analyzed samples from said sample holder to said sample tray, and sequentially supplies multiple samples to said sample holder.

5. The thermal analysis system according to claim 1, wherein said sample holding member comprises a horizontal type balance mechanism enabling the measurement of a mass of the samples, and wherein a wiring from said horizontal type balance mechanism leads to the internal space of said sample preparation apparatus through an interior of said coupling mechanism and said sealing mechanism when the balance mechanism is disposed inside the system conducting thermal analysis.

6. The thermal analysis system according to claim 1, wherein the heater of said system conducting thermal analysis has a perforation through hole from an exterior for the purposes of confirmation of the position of said sample holder.

7. The thermal analysis system according to claim 1, wherein said sample holding member additionally comprises a reference substance holder mounting a reference substance adjacent to the samples, and said temperature sensor is a differential thermal analysis sensor measuring a temperature difference between the samples and the reference substance.

8. The thermal analysis system according to claim 7, wherein said sample holding member comprises two parallel arrayed horizontal type balance mechanisms, one of said two horizontal type balance mechanisms includes the sample holder, and the other includes the reference substance holder for detecting a differential calorimetry signal of a mass difference between the samples and the reference substance.

9. The thermal analysis system according to claim 1, further comprising a system for controlling said sample preparation apparatus and said system conducting thermal analysis, wherein said system for controlling places said sample holder within said system conducting thermal analysis, while simultaneously sustaining both of a dew point temperature and a pressure in the internal space of said sample preparation apparatus and in said heating tube.

10. The thermal analysis system according to claim 9, wherein said system for controlling places said sample holder within said system conducting thermal analysis, in a state sustaining the dew point temperature at or under −80° C. in the internal space of said sample preparation apparatus and in said heating tube.

11. The thermal analysis system according to claim 1, wherein said sealing mechanism is provided by said wall of said sample preparation apparatus, and includes an open tube extending from a proximal edge of said aperture to the internal space of said sample preparation apparatus, end an annular sealing member provided on an interior surface of the open tube, and a sealing tube surrounding the outside of the sample holding member disposing said sample holder on the tip terminus thereof, wherein an outer peripheral surface of said sealing tube fits in to an inner diameter surface of said sealing member.

12. The thermal analysis system according to claim 11, wherein said open tube extends from said aperture to an outer side of said wall, and said gate is fitted on an outer terminal of said open tube, and wherein in a fitted-in state of the outer peripheral surface of said sealing tube to the inner diameter surface of said sealing member, and by transferring said sample holder by said transfer mechanism, said sample holder is disposed in a switchable manner between an inner side of said open tube in a standby position, and a thermal analysis position housing said sample holder in said heating tube.

13. The thermal analysis system according to claim 12, wherein the inner side of said open tube at the outer side of said wall can draw vacuum and/or or can supply gas to the inner side of said open tube.

\* \* \* \* \*